US007747398B2

(12) United States Patent
McNutt

(10) Patent No.: US 7,747,398 B2
(45) Date of Patent: Jun. 29, 2010

(54) SYSTEMS, METHODS AND DEVICES FOR GENERATING PULSES

(75) Inventor: Alan D. McNutt, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 582 days.

(21) Appl. No.: 11/177,275

(22) Filed: Jul. 8, 2005

(65) Prior Publication Data

US 2005/0278130 A1 Dec. 15, 2005

Related U.S. Application Data

(62) Division of application No. 10/309,539, filed on Dec. 4, 2002, now Pat. No. 7,158,900.

(60) Provisional application No. 60/346,488, filed on Jan. 7, 2002, provisional application No. 60/384,979, filed on Jun. 3, 2002.

(51) Int. Cl.
*G01R 15/00* (2006.01)
(52) U.S. Cl. ...................... 702/57
(58) Field of Classification Search .......... 702/182, 702/183, 41, 46, 57, 60, 65, 73–76, 78–80, 702/96, 106, 107, 125, 141, 145, 148–151, 702/158, 176, 188; 318/696, 268; 123/674; 340/5.8; 455/556; 187/295; 327/291; 700/61
See application file for complete search history.

(56) References Cited

U.S. PATENT DOCUMENTS

| | | | | | |
|---|---|---|---|---|---|
| 3,612,220 | A | * | 10/1971 | Hall et al. | 187/295 |
| 3,673,395 | A | * | 6/1972 | Tripp | 702/96 |
| 3,713,102 | A | * | 1/1973 | Martin | 340/5.8 |
| 5,222,028 | A | * | 6/1993 | LaBarre et al. | 702/73 |
| 5,464,000 | A | * | 11/1995 | Pursifull et al. | 123/674 |
| 5,508,596 | A | * | 4/1996 | Olsen | 318/569 |
| 5,724,786 | A | * | 3/1998 | Singh et al. | 53/52 |
| 5,890,187 | A | * | 3/1999 | Asghar | 711/4 |
| 6,028,412 | A | * | 2/2000 | Shine et al. | 318/696 |
| 6,046,567 | A | * | 4/2000 | Hayes | 318/696 |
| 6,140,793 | A | * | 10/2000 | Carr et al. | 318/696 |
| 6,208,107 | B1 | * | 3/2001 | Maske et al. | 318/685 |
| 6,285,155 | B1 | * | 9/2001 | Maske et al. | 318/685 |
| 6,323,713 | B1 | * | 11/2001 | Yuzue | 327/291 |
| 6,335,769 | B1 | * | 1/2002 | Misaku | 348/738 |
| 6,414,460 | B1 | * | 7/2002 | Li et al. | 318/685 |
| 6,434,516 | B1 | * | 8/2002 | Topmiller | 702/198 |
| 6,435,716 | B1 | * | 8/2002 | Polkus et al. | 378/205 |
| 6,589,791 | B1 | * | 7/2003 | LaBudde et al. | 436/55 |
| 6,653,810 | B2 | * | 11/2003 | Lo | 318/569 |
| 6,738,659 | B2 | * | 5/2004 | Hsu | 600/478 |
| 6,763,282 | B2 | * | 7/2004 | Glenn et al. | 700/245 |
| 6,823,221 | B2 | * | 11/2004 | Peck et al. | 700/61 |
| 6,831,431 | B1 | * | 12/2004 | Dieterle et al. | 318/268 |
| 6,983,636 | B2 | * | 1/2006 | Johnson et al. | 73/1.36 |
| 2002/0025833 | A1 | * | 2/2002 | Martin et al. | 455/556 |
| 2003/0028266 | A1 | * | 2/2003 | Jacques | 700/32 |

\* cited by examiner

*Primary Examiner*—Mohamed Charioui
(74) *Attorney, Agent, or Firm*—Jose de la Rosa

(57) ABSTRACT

At least one exemplary embodiment of the present invention includes a method comprising obtaining a first frequency and a second frequency. The method also comprises creating a table of values comprising a plurality of target frequencies intermediate to the first and second pulse width corresponding to each of the target frequencies from the plurality of target frequencies. The method further comprises outputting at least a portion of the values to a motion device.

17 Claims, 13 Drawing Sheets

9000

10000

SYSTEMS, METHODS AND DEVICES FOR GENERATING PULSES

DIVISIONAL PATENT APPLICATION

The present application is a divisional patent application of patent application Ser. No. 10/309,539 filed on Dec. 4, 2002 now U.S. Pat. No. 7,158,900, of McNutt for "Pulse Output Function for a Programmable Logic Controller".

CROSS-REFERENCE TO RELATED APPLICATIONS

This application claims priority to, and incorporates by reference herein in its entirety, the following provisional applications:
Ser. No. 60/346,488, filed 7 Jan. 2002; and
Ser. No. 60/384,979, filed 3 Jun. 2002.

BRIEF DESCRIPTION OF THE DRAWINGS

The invention and its wide variety of potential embodiments will be readily understood via the following detailed description of certain exemplary embodiments, with reference to the accompanying drawings in which.

DETAILED DESCRIPTION

At least one exemplary embodiment of the present invention includes a method comprising obtaining a first position, a second position, and a maximum motion parameter for a movement between the first position and the second position. The method also comprises creating a table of values comprising a plurality of target frequencies for the movement, the table of values also comprising a pulse width, a pulse count, and a differential pulse width corresponding to each of the target frequencies from the plurality of target frequencies. The method also comprises outputting at least a portion of the values from a pulse generator.

At least one exemplary embodiment of the present invention includes a method comprising obtaining a first frequency and a second frequency. The method also comprises creating a table of values comprising a plurality of target frequencies intermediate to the first and second frequencies, the table of values also comprising a pulse width, a pulse count, and a differential pulse width corresponding to each of the target frequencies from the plurality of target frequencies. The method also comprises outputting at least a portion of the values to a motion device. The method can also comprise transmitting the at least a portion of the values over the Internet.

At least one exemplary embodiment of the present invention includes a device comprising a sub-incremental clock-count-derived pulse generator. At least one exemplary embodiment of the present invention includes a device comprising a pulse generator adapted to produce a change from a first pulse output frequency to a second pulse output frequency by interpolating between pre-computed intermediate pulse output frequencies, a width of each pulse derived from real-time sub-incremental addition of clock counts during periods of acceleration and deceleration.

At least one exemplary embodiment of the present invention includes a system comprising an arithmetic logic unit. The system also comprises a memory comprising a pre-computed table of target pulse widths, changes in pulse width, and pulse counts distributed according to a constrained semi-logarithmic distribution, said memory connected to said arithmetic logic unit via a pipeline mechanism. The system further comprises a state machine adapted to load each of said target pulse widths and changes in pulse width from said memory into said arithmetic logic unit at pre-determined intervals of pulse count while maintaining control of a pulse width generated by said arithmetic logic unit.

Figure 1:
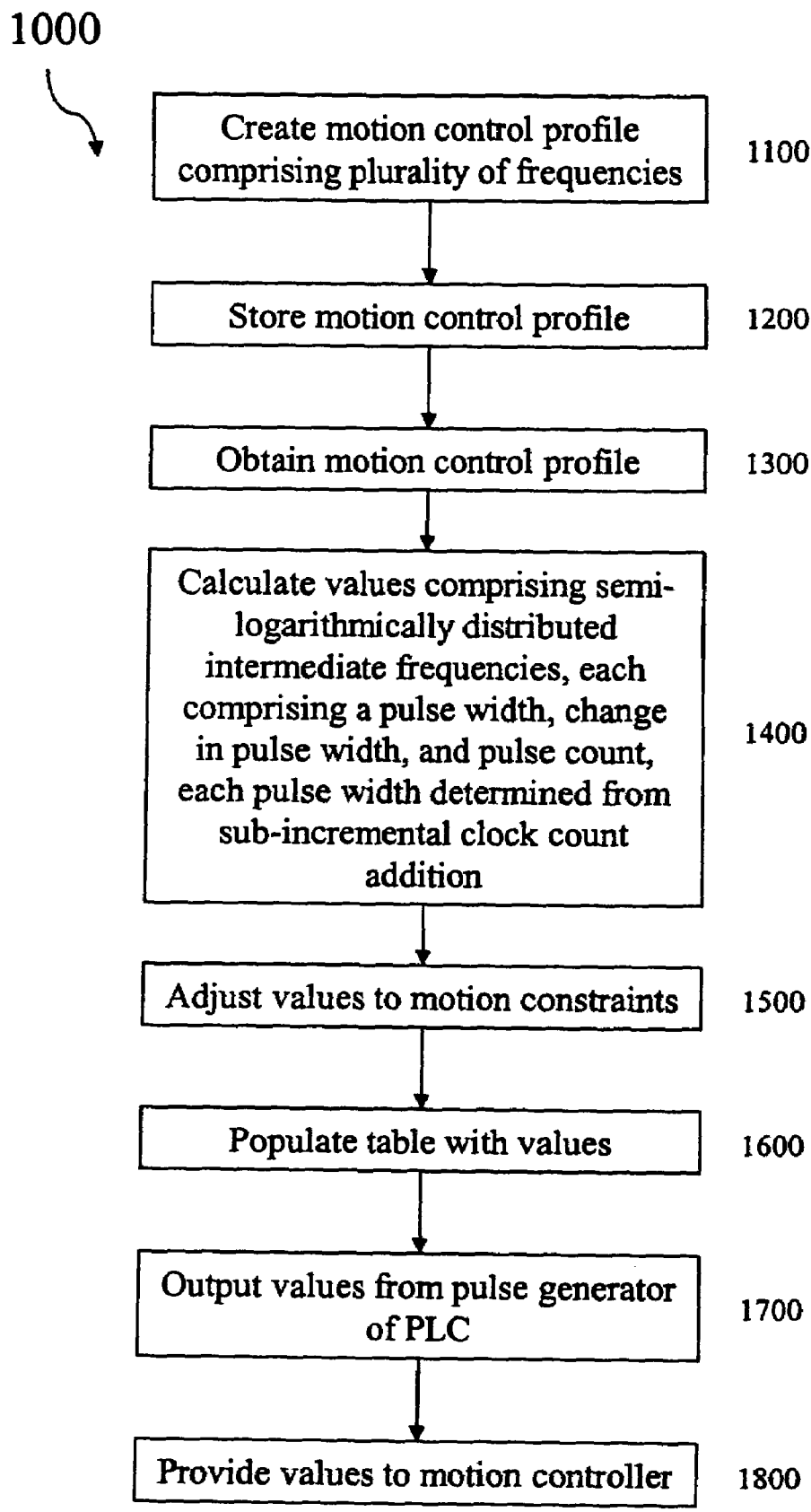
FIG. 1 is a flowchart of an exemplary embodiment of a method 1000 of the present invention.

FIG. 1 is a flowchart of an exemplary embodiment of a method 1000 of the present invention. In certain embodiments, method 1000 can be utilized in conjunction with a pulse generator that affects a motion device. A motion device can be any device capable of being controlled by a variable frequency pulse train, including a motion controller, such as a stepper motor controller, a servo controller, an actuator controller, etc.; a motion drive, such as a stepper drive, servo drive, etc.; and/or a actuator, such as a stepper motor, servo-motor, linear motor, motor, ball screw, servo valve, hydraulic actuator, pneumatic valve, etc. It is recognized that a pulse generator can produce a series of pulses, called a pulse train. According to certain embodiments of the present invention, a variable frequency pulse generator can produce a pulse train that can vary in frequency, count, width, and/or differential width (also referred to herein as "change in pulse width"). At the motion device, the frequency of the pulse train can control speed and/or the pulse count can control position.

At activity 1100, a motion control profile can be created, potentially by a user of the pulse generator. The user can provide a desired angular and/or linear distance to be traveled and a speed at which to cover the distance.

n certain embodiments, the user can provide a maximum velocity, a maximum acceleration, a maximum change in acceleration with respect to time (sometimes referred to as "jerk" or specified as a "jerk time"), and/or a maximum change in jerk with respect to time. The user can determine these values deterministically and/or empirically to achieve desired machine movements and/or avoid undesired effects, such as motor stalling, motor slippage, or other motion device problems (e.g., excess stresses, loss of friction between conveyed items and a conveyor belt, flinging of liquids, etc.).

In response, a motion control profile can be rendered. In certain embodiments, the motion control profile can indicate desired positions and times for a motion device on a position versus time plot. In other embodiments, the motion control profile can indicate a desired frequency ramp for a motion device on a frequency versus time plot. Such a motion control profile can include a beginning and an ending frequency, and can be linear, curvilinear, or a combination of linear and curvilinear portions between the frequencies. Potentially based on the user's input, in some cases the motion control profile can reflect an S-curve, in which the "take-off" from the beginning frequency gradually ramps up in frequency change, and the "landing" to the ending frequency gradually ramps down in frequency change, to avoid abruptness in frequency change near the beginning and ending frequencies. The motion control profile can be stored as, for example, a table of time-frequency points. Other potential plots can include position versus pulse count, frequency versus pulse count, speed versus time, speed versus position, acceleration versus time, acceleration versus pulse count, acceleration versus position, acceleration versus frequency, and/or acceleration versus speed. Note that a motion control profile can provide expressly certain motion parameters, and can imply other motion parameters. For example, a motion control profile can expressly describe a beginning position, an ending position, and a time over which a motion between the beginning and ending positions is to occur, which by implication describes an average velocity for the motion.

At activity 1200, the motion control profile can be stored, such as in a memory, for later retrieval. At activity 1300, the motion control profile can be obtained by, for example, a motion control processor of a pulse generator module of a programmable logic controller ("PLC").

At activity 1400, the motion control processor can load a first and second frequency from the motion control profile, and can calculate a plurality of intermediate frequencies. The motion control processor can seek to adjust the pulse width of each pulse so as to achieve the frequency (corresponding to speed), acceleration, and/or change in acceleration specifications of the specific application while also meeting intermediate and/or total pulse count (corresponding to distance) specifications. Because each pulse has a finite width, and because pulse width can vary within a pulse train, new values of pulse width can be needed from a few times per second to several hundred thousand or millions of times per second in current typical applications.

For a motion control processor intended to supply a broad variety of end use needs, the range of motion parameters (e.g., frequencies, accelerations, times, and/or distances, etc.) to be accommodated can be represented and calculated as floating point values, and/or in a versatile fixed point format with a large number of significant digits. In certain embodiments of the present invention, the values can be computed before needed and stored in a memory for retrieval and use in real time.

At least one embodiment of the present invention can compute values (e.g., pulse width, change in pulse width, and/or number of pulses, etc.) associated with a plurality of frequencies intermediate in value to the first and second frequencies of the motion control profile prior to the start of motion and can store the values in memory. During execution of the motion, these values can be fetched from memory at predetermined intervals of pulse count. The pulse widths of individual pulses issued during the intervals between fetched values can be computed as a simple linear addition of a change in pulse width for each pulse, accomplishing in real time an interpolation between the pre-calculated values of pulse width associated with the plurality of intermediate frequencies.

Computation of values prior to the start of motion, when calculation time is relatively unconstrained, can allow calculation to a desired level of precision with a processor that is limited in size, cost, and/or power. Computation of values associated with a sufficiently sparse plurality of intermediate frequencies can allow storage of the pre-computed data in a memory that is limited in size, cost, and/or power. In certain cases, changing each pulse width by means of a simple additive interpolation between the pre-computed points can allow for a closer approximation to the desired motion control profile than would be achieved by using only the plurality of intermediate frequencies, while limiting the cost, size, and/or power of the computing device that is required to have a fresh value available for each pulse as it occurs.

Where a pulse is defined as an event comprising a period of a logical "1" and a logical "0", simple addition of a constant value to the pulse width with each pulse produces a non-linear change in frequency, since frequency is the inverse of pulse width. Sustained addition of a constant value to the pulse width can produce a markedly curved change in frequency with respect to time, with low acceleration at low frequency and high acceleration at high frequency. In order to achieve a given desired adherence to the specified frequency profile, the intervals between the points of the plurality of intermediate frequencies can be controlled, thereby controlling the curvature produced by the interpolative addition of a constant to the pulse width. For a constant acceleration region of a profile, said curvature is more marked at the lower values of frequency. By distributing the intervals between the points of the plurality of frequencies according to a semi-logarithmic progression, (or equivalently, by advancing each interval of increasing frequency by an equal predetermined percentage of the preceding frequency) a distribution of points can be achieved whereby more points are placed at the lower values of frequency where more attention to curvature control is desired, thus achieving a desired level of adherence to the profile with fewer points than would be achieved by points distributed equally in time.

Complete adherence to this semi-logarithmic distribution of points can result in very few points at the higher frequency portion of a frequency change region. For frequency profiles that include controlled changes in acceleration (S curves, or controlled "jerk") sufficient points can be included at the higher frequencies to describe, to the desired level of accuracy, the desired limited change in acceleration between a region of high acceleration and a region of low acceleration or no acceleration (constant speed). Thus, the increasing interval between pre-calculated frequency points implied by a semi-logarithmic progression can be constrained, or limited, to provide points at some maximum interval consistent with representing the anticipated range of curvature desired for the S-curve, or limited acceleration case.

Further, there can be practical limits on the minimum interval between points, as required by, for example, a processor interrupt response time needed to load a new set of values, and/or by the requirement that the realizable intervals be greater than a current pulse width. Thus, the intervals calculated by the semi-logarithmic distribution can be examined and suitably constrained to no less than some minimum quantity determined by the implementing system constraints.

Each pulse width can be produced by counting out an integral number of clock events of some suitably higher frequency master clock, which number of clock events can be the stored representation of pulse width value, and each change in pulse width can be produced by adding a positive or negative number to the current value. In order to achieve the desired range of frequencies, accelerations, and/or pulse counts, with a desired level of precision, at least one embodiment of the current invention can represent the change in pulse width with an integral number of clock events and a sub-integral or fractional part number of clock events. A fractional part of a clock event is not necessarily expressed in a non-integral number of clock events per realized pulse width, but can be accumulated on each of the pulse width change additions for the specified interpolation interval. At such time that the accumulation of fractional or sub-integral parts exceeds a whole value, this whole value can become part of the expressed number of integral clock events per pulse width.

At activity 1500, any or all of the calculated values can be adjusted to conform to predetermined motion constraints and/or parameters. For the purposes of this application, motion constraints can include constraints on frequency, the first derivative of frequency with respect to time, and/or the second derivative of frequency with respect to time. Motion constraints can also include constraints on angular and/or linear position, velocity, acceleration, jerk (the first derivative of acceleration with respect to time), and/or the second derivative of acceleration with respect to time. Note that those constraints that are expressed as derivatives can be approximated using predetermined differential values (increments) of time. For example, jerk can be approximated as a maximum allowable acceleration value divided by a chosen increment of time. As another example, a specified minimum motion time can be followed.

Motion constraints can apply at any region of the motion control profile. For example, when first beginning a change in position of a stepper motor shaft, to avoid potential challenges such as slippage, jerk can be limited to a predetermined amount, such as 0.01 radian per second$^3$ or 0.01 mm per second$^3$.

At activity 1600, a table can be populated with the calculated and/or adjusted values. Each row of the table can contain a different intermediate frequency, each intermediate frequency having a corresponding pulse width, change in pulse width, and/or pulse count. Two adjacent rows can be considered to contain an adjacent pair of intermediate frequencies.

At activity 1700, the table can be read by a pulse generator of the PLC to output a pulse train. Table values can be provided to a motion control processor of the pulse generator, which can comprise a pipeline mechanism, an arithmetic logic unit ("ALU"), and/or a controlling state machine. The ALU can provide interpolated intermediate values of pulse width by adding a supplied positive or negative change in pulse width to each successive pulse width value, for the indicated number of pulses. The ALU may add a value representing an integral number and a non-integral or fractional number of master clock events, accumulating the fractional number over multiple pulse widths until such accumulation exceeds a whole number and is incorporated into the expressed pulse width. Control of the reading of the table and output of the pulse train can be governed by the state machine at predefined intervals, which intervals can be indefinitely deferred, interrupted, and/or re-initiated by command and/or external event while maintaining control of pulse width.

At activity 1800, the pulse train can be provided to a motion device. The pulse train can be provided via a direct connection to the pulse generator, and/or via a network connection, such as an Internet connection. The pulse train can be provided as a digital or an analog signal.

Figure 2:
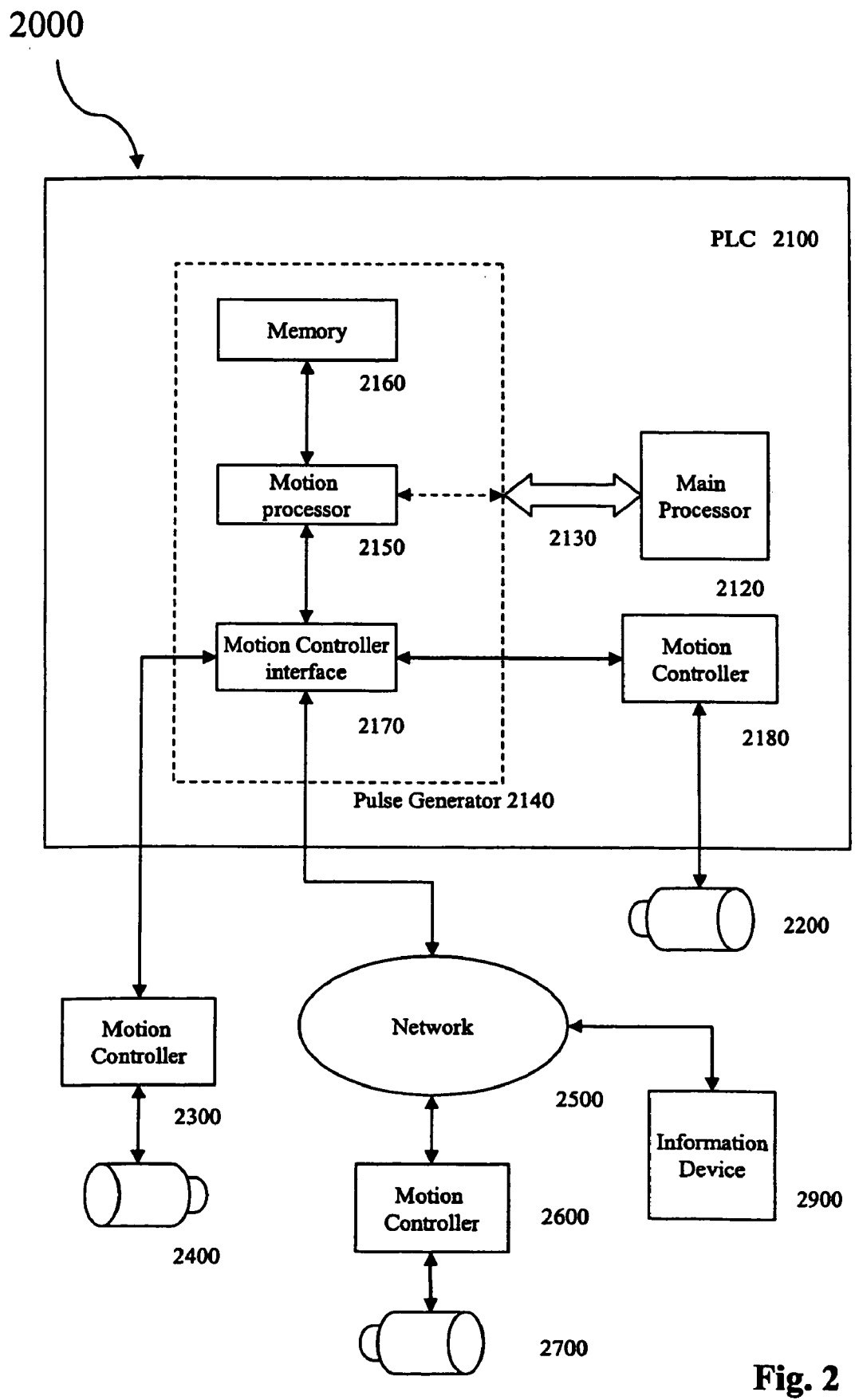
FIG. 2 is a block diagram of an exemplary embodiment of a system 2000 of the present invention.

FIG. 2 is a block diagram of an exemplary embodiment of a system 2000 of the present invention. System 2000 can include a programmable logic controller ("PLC") 2100 comprising a main processor 2120 coupled via a connector 2130 to a pulse generator 2140. In certain embodiments, pulse generator 2140 can connect to a connector 2300 such as a system backplane and/or an expansion input/output bus of PLC 2100.

Pulse generator 2140 can be integral to PLC 2100. That is, once installed, pulse generator 2140 can be a component of PLC 1100, rather than free standing. Pulse generator 2140 can include a motion processor 2150 having a memory 2160, such as a dual port RAM. Motion processor 2150 can be a commercially available general-purpose microprocessor. In another embodiment, motion processor 2150 can be an Application Specific Integrated Circuit (ASIC) that has been designed to implement in its hardware and/or firmware at least a part of a method in accordance with an embodiment of the present invention. In yet another embodiment, motion processor 2150 can be a Field Programmable Gate Array (FPGA).

Memory 2160 can contain instructions that can be embodied in software, which can take any of numerous forms that are well known in the art. Pulse generator 2140 also can include a communications interface 2170, such as a bus, a connector, a telephone line interface, a wireless network interface, a cellular network interface, a local area network interface, a broadband cable interface, etc.

Pulse generator 2140 can be connected to a motion controller 2300 that is separate from PLC 2100. Motion controller 2300 can be connected to a motion drive and/or an actuator 2400. Pulse generator 2140 also can be connected via a network 2500 to a motion controller 2600 that is separate from PLC 2100. Network 2500 can be a public switched telephone network (PSTN), a wireless network, a cellular network, a local area network, the Internet, etc. Motion controller 2600 can be connected to a motion drive and/or an actuator 2700. Further, pulse generator 2140 can be connected to a motion controller 2180 that is integral to PLC 2100. Motion controller 2180 can be connected to a motion drive and/or an actuator 2200.

Connected to network 2500 also can be an information device 2900, such as a traditional telephone, telephonic device, cellular telephone, mobile terminal, Bluetooth device, communicator, pager, facsimile, computer terminal, personal computer, etc. Information device 2900 can be used to program, interact with, and/or monitor pulse generator 2140.

Figure 3:
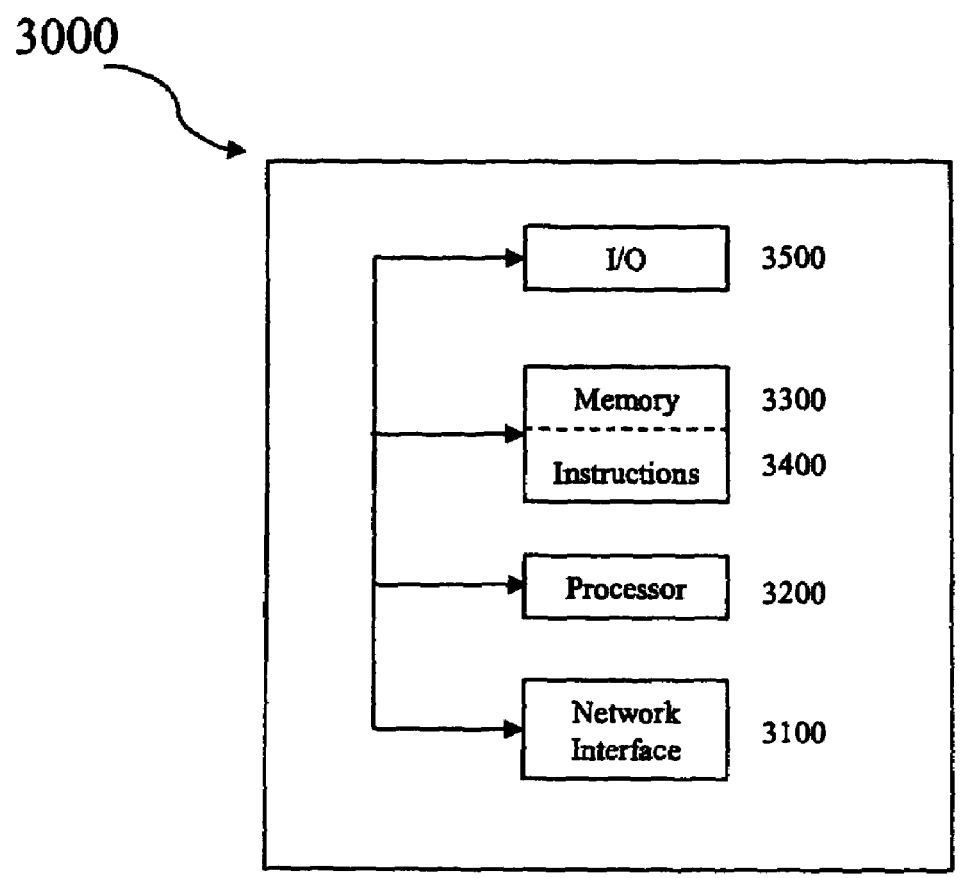
FIG. 3 is a block diagram of an exemplary embodiment of an information device 3000 of the present invention.

FIG. 3 is a block diagram of an exemplary embodiment of an information device 3000 of the present invention. Information device 3000 can represent information device 2900 of FIG. 2. Information device 3000 can include well-known components such as one or more network interfaces 3100, one or more processors 3200, one or more memories 3300 containing instructions 3400, and/or one or more input/output (I/O) devices 3500, etc.

In one embodiment, network interface 3100 can be a telephone, a cellular phone, a cellular modem, a telephone data modem, a fax modem, a wireless transceiver, an Ethernet card, a cable modem, a digital subscriber line interface, a bridge, a hub, a router, or other similar device.

Each processor 3200 can be a commercially available general-purpose microprocessor. In another embodiment, the processor can be an Application Specific Integrated Circuit (ASIC) or a Field Programmable Gate Array (FPGA) that has been designed to implement in its hardware and/or firmware at least a part of a method in accordance with an embodiment of the present invention.

Memory 3300 can be coupled to a processor 3200 and can store instructions 3400 adapted to be executed by processor 3200 according to one or more activities of a method of the present invention. Memory 3300 can be any device capable of storing analog or digital information, such as a hard disk, Random Access Memory (RAM), Read Only Memory (ROM), flash memory, a compact disk, a digital versatile disk (DVD), a magnetic tape, a floppy disk, and any combination thereof.

Instructions 3400 can be embodied in software, which can take any of numerous forms that are well known in the art.

Any input/output (I/O) device 3500 can be an audio and/or visual device, including, for example, a monitor, display, keyboard, keypad, touchpad, pointing device, microphone, speaker, video camera, camera, scanner, and/or printer, including a port to which an I/O device can be attached or connected.

Certain exemplary embodiments of the present invention include a position or motion module that connects a PLC to stepper motor via a stepper drive controller. Certain exemplary embodiments of this module are sometimes referred to herein as the EM 253 Motion Module. Certain exemplary embodiments of the PLC are sometimes referred to herein as the S7-200. Certain exemplary embodiments of the stepper motor are sometimes referred to herein as the Simostep P50 motor. Certain exemplary embodiments of the stepper drive controller are sometimes referred to herein as the Simodrive FM Step Drive.

Features of the EM 253 Motion Module

The EM 253 Motion Module can identify itself as an S7-200 intelligent module and can provide local inputs and outputs for interfacing with, for example, a single axis stepper motor as specified herein.

Communication between the module and the S7-200 PLC can be transacted over the Expansion I/O bus. The appropriate hardware can be provided in order to support communication initiated by either the PLC or the module.

The EM 253 Motion Module can provide the pulse outputs for motion control from 12 pulses per second (pps) to 200 K pulses per second (pps). In the event that this span of pulse rates cannot be provided as a single range, the module firmware can automatically select the operating range based upon the maximum speed specified in the module configuration. Based upon the maximum speed (MAX_SPEED) the module can compute the minimum speed (MIN_SPEED) for that range. The following ranges can be supported:

| Speed Range | MIN_SPEED |
| --- | --- |
| MAX_SPEED up to 2K pps | 12 pps |
| MAX_SPEED up to 10K pps | 60 pps |
| MAX_SPEED up to 50K pps | 300 pps |
| MAX_SPEED up to 200K pps | 1200 pps |

Programming Interface to the EM253 Motion Module

The S7-200 programming software can provide three functions to aid module configuration, profile creation, and module operation (control and status monitoring).

The configuration function can prompt the user to enter the required parameters. Then the profile creation function can prompt the user for the required information for each move profile. The information for each move profile can then be converted into a sequence of steps with a move identification number. Once the user has entered the information for the configuration and all the move profiles, the sequence of steps for each move can be combined into a single table as specified herein. The pointer to the V memory table can be stored in the section of the SDB provided for the module. Then both the data block for V memory and the SDB can be downloaded to the PLC.

A library instruction using the PCALL instruction and its corresponding subroutine can be provided as a standard function for controlling the module's operation. The user can be able to monitor the module's operation by enabling execution status of the library instruction.

Expansion I/O Bus Interface

The module can provide a ten-pin ribbon cable for connection to the expansion I/O bus interface on the PLC or previous I/O expansion module. It can also provide a ten-pin ribbon cable connector (male) into which another I/O expansion module can be connected. The module can return the ID code 0x21 which identifies the module as:

(a) An intelligent module (b) Discrete I/O (c) No inputs (d) With 8 discrete outputs The module can provide a dual port RAM through which communication with the PLC can be accomplished. Configuration information for the module can be accessed using either the MPI or the more efficient Block Data Transfer. The module can utilize a maximum of one MPI request and/or multiple Block Data Transfer (BDT) request per transaction with the S7-200 CPU.

As part of power up initialization, the module can clear all data in the dual port RAM Banks 0 through 7. The fifty bytes of SM data area allocated for the intelligent module are defined in Table 1 (the definition is given as if this were the first intelligent module in the I/O system). In order for the CUR_POS and CUR_SPEED values to be consistent with one another the module H/W design can provide the facilities to capture both values as an atomic operation.

TABLE 1

Dual Port RAM Bank Definition (Banks 8 through 15)

| SM Address | Description |
| --- | --- |
| SMB200 To SMB215 | Module name (16 ASCII characters) SMB 200 is the first character. "EM253 Position". |
| SMB216 To SMB219 | S/W revision number (4 ASCII characters) SMB216 is the first character. |
| SMB220 | Error code (SMB 220 is the MSB of the error code) |

TABLE 1-continued

Dual Port RAM Bank Definition (Banks 8 through 15)

| SM Address | Description |
|---|---|
| To SMB221 | 0000 - No error<br>0001 - No user power<br>0002 - Configuration block not present<br>0003 - Configuration block pointer error<br>0004 - Size of configuration block exceeds available V memory<br>0005 - Illegal configuration block format<br>0006 - Too many profiles specified<br>0007 - Illegal STP_RSP specification<br>0008 - Illegal LIM− specification<br>0009 - Illegal LIM+ specification<br>000A - Illegal FILTER_TIME specification<br>000B - Illegal MEAS_SYS specification<br>000C - Illegal RP_CFG specification<br>000D - Illegal PLS/REV value<br>000E - Illegal UNITS/REV value<br>000F - Illegal RP_ZP_CNT value<br>0010 - Illegal JOG_INCREMENT value<br>0011 - Illegal MAX_SPEED value<br>0012 - Illegal SS_SPD value<br>0013 - Illegal RP_FAST value<br>0014 - Illegal RP_SLOW value<br>0015 - Illegal JOG_SPEED value<br>0016 - Illegal ACCEL_TIME value<br>0017 - Illegal DECEL_TIME value<br>0018 - Illegal JERK_TIME value<br>0019 - Illegal BKLSH_COMP value<br>0020 to FFFF - Reserved |
| SMB222 | Input/output status - reflects the status of the module inputs and outputs status |

```
MSB                                    LSB
 7   6  5   4    3      2     1    0
|DIS| 0| 0|STP|LMT-|LMT+|RPS|ZP|
```

| | | |
|---|---|---|
| DIS | Disable outputs | 0 = no current flow, 1 = current flow |
| STP | Stop input | 0 = no current flow, 1 = current flow |
| LMT− | Negative travel limit input | 0 = no current flow, 1 = current flow |
| LMT+ | Positive travel limit input | 0 = no current flow, 1 = current flow |
| RPS | Reference point switch input | 0 = no current flow, 1 = current flow |
| ZP | Zero pulse input | 0 = no current flow, 1 = current flow |

When an error condition or a change in status of the data is detected, the module can indicate this by updating the SM locations corresponding to the module's position. If it is the first module, it will update SMB200 through SMB249 as required to report the error condition. If it is the second module, it will update SMB250 through SMB299; and so on.

The module can implement Banks 15 through 127 for module initiated communication to the PLC. There is no requirement for the module to implement Banks 128 through 255

Module Configuration and Profile

Both the configuration and the profile information can be stored in a table in V memory in the PLC. The EM 253 Motion Module can access its configuration and profile information using the pointer value supplied in the SM locations in the PLC.

The Configuration/Profile Table can be divided into three sections. The first section is the Configuration Block, which can contain information used to set-up the module in preparation for executing motion commands. The second section is the Interactive Block, which can support direct setup of motion parameters by the user program. The third section can contain from 0 to 64 Profile Blocks, each of which can describe a predefined move operation that can be performed by the module.

Configuration Block
Interactive Block
Profile Blocks

Before the module can execute a profiled motion, it can perform the calculations to convert the general speed and position data provided in the profile block to the specific data and actions required to actually perform the move. These calculations can be performed whenever the module first sees the profile, but to improve responsiveness on subsequent executions of the profile, the module can provide a cache memory to store the complete execution data for up to four profiles. When the user commands the execution of a given profile, the module can check the cache to see if the profile is resident. If the profile is resident in the cache, the profile can be executed immediately. If the profile is not resident in the cache, the module can transfer the profile from the PLC's V memory to cache before it is executed.

Figure 4:
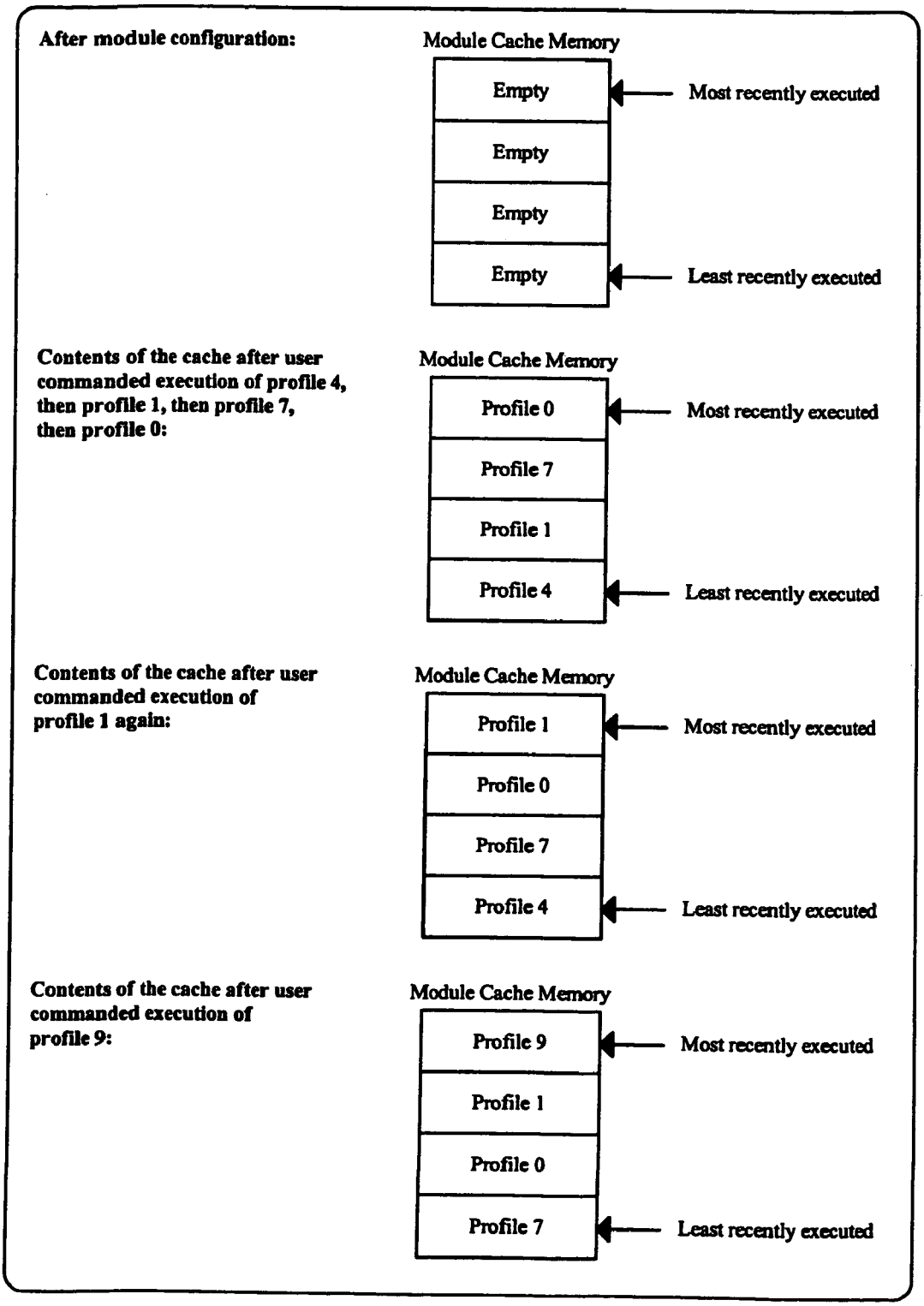
FIG. 4 is a block diagram of an exemplary embodiment of cache behavior of an exemplary motion module of the present invention.
Figure 5:
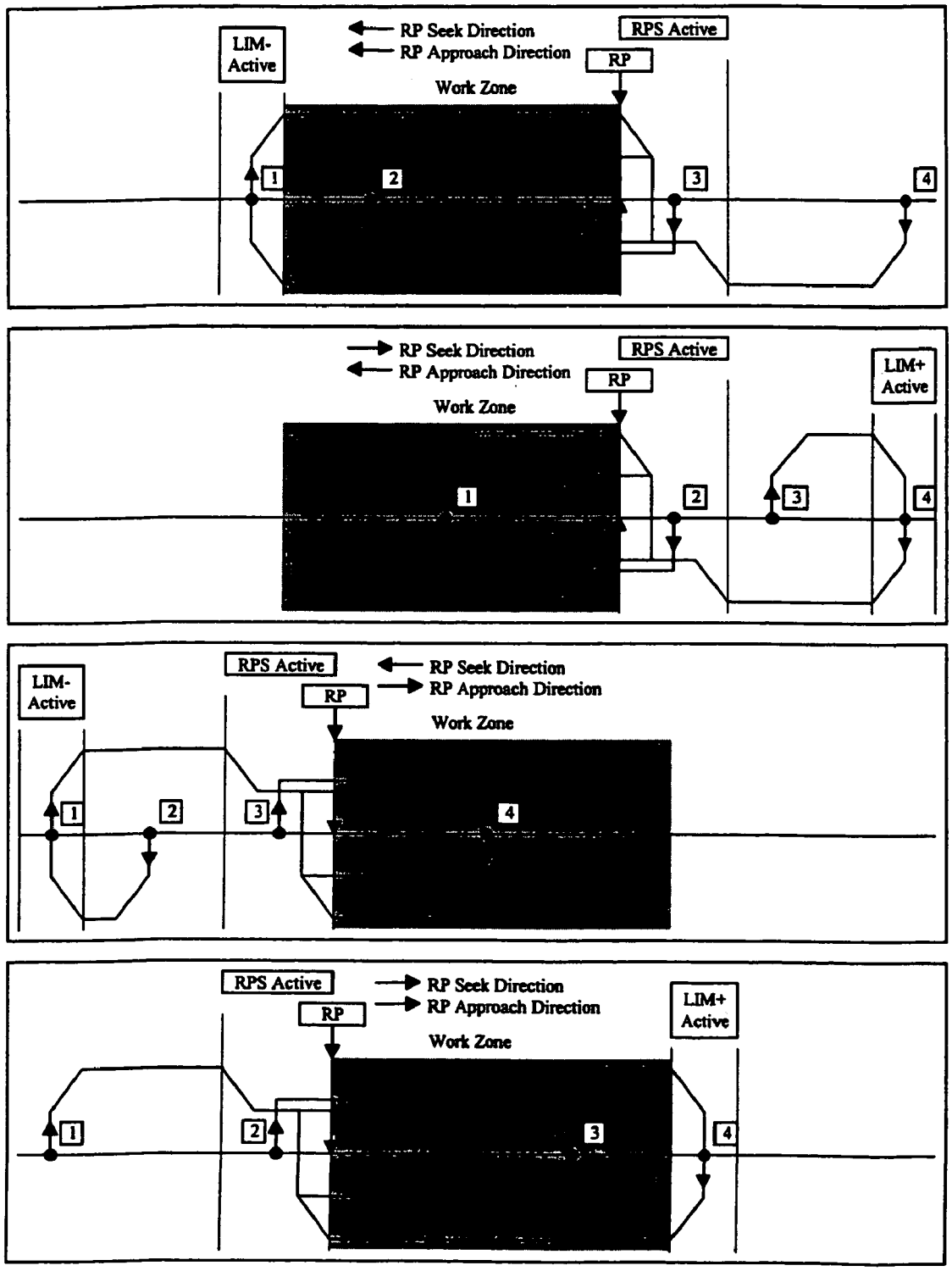
FIG. 5 is a reference point seek diagram of an exemplary motion module of the present invention.
Figure 6:
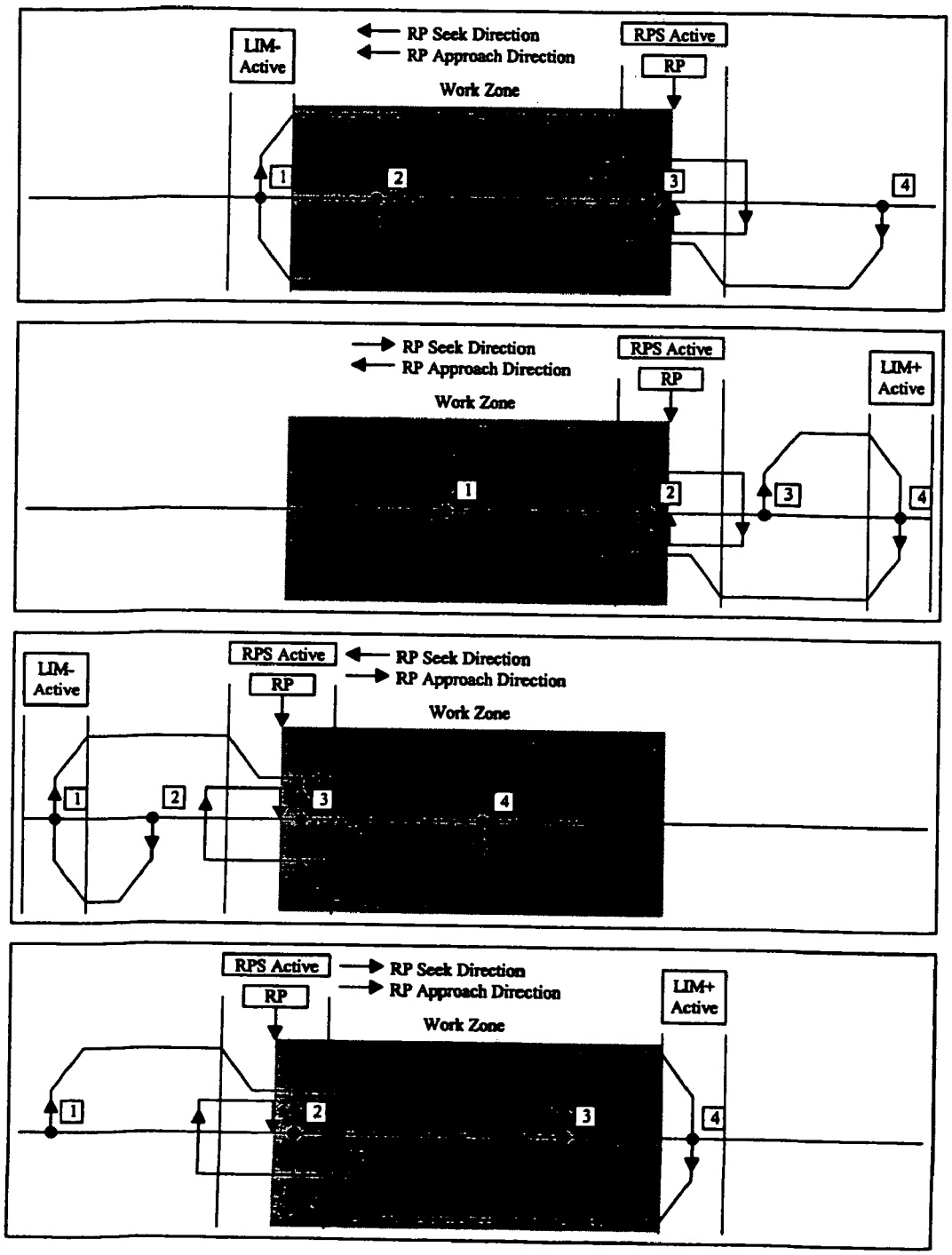
FIG. 6 is a reference point seek diagram of an exemplary motion module of the present invention.
Figure 7:
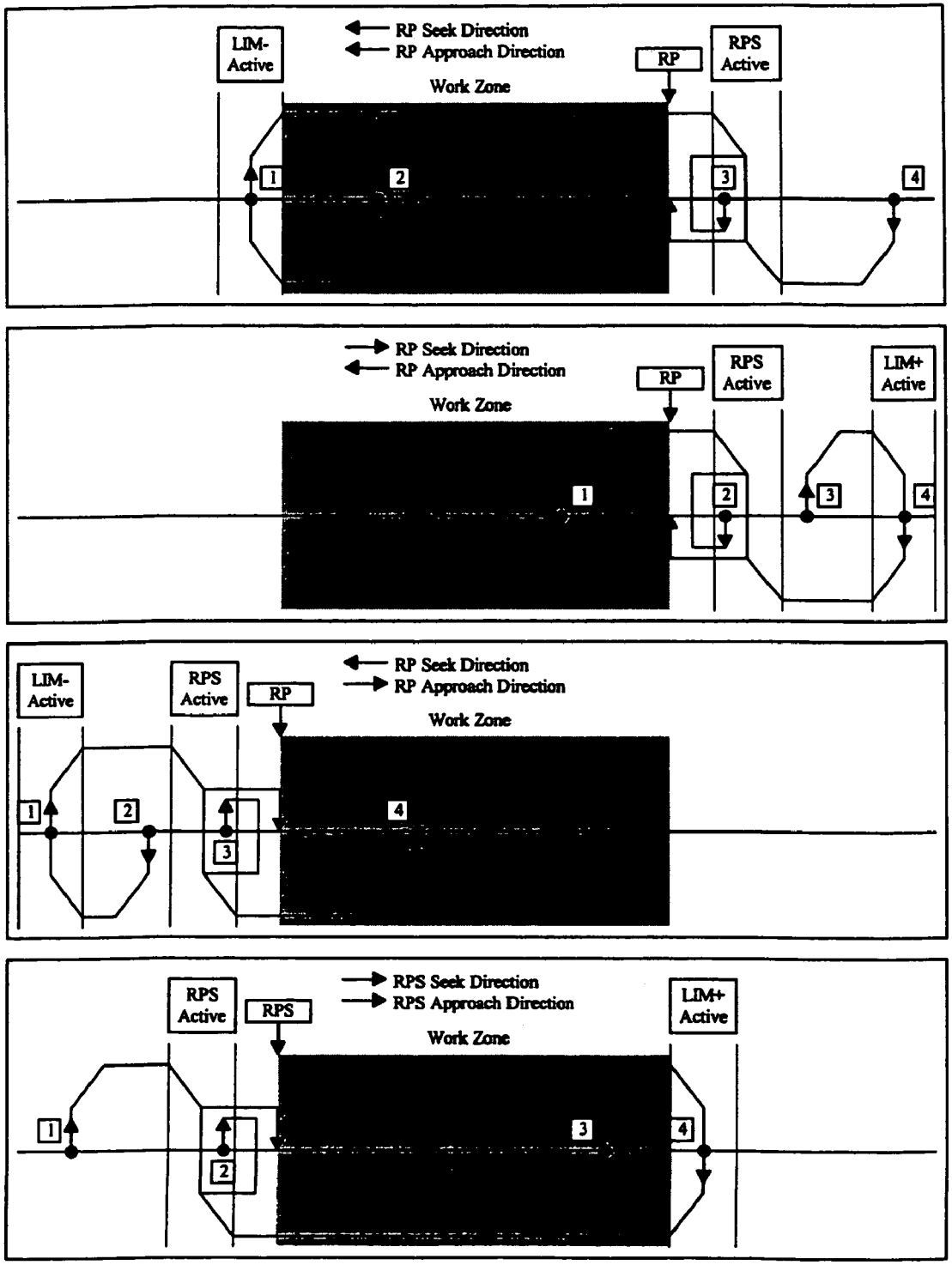
FIG. 7 is a reference point seek diagram of an exemplary motion module of the present invention.
Figure 8:
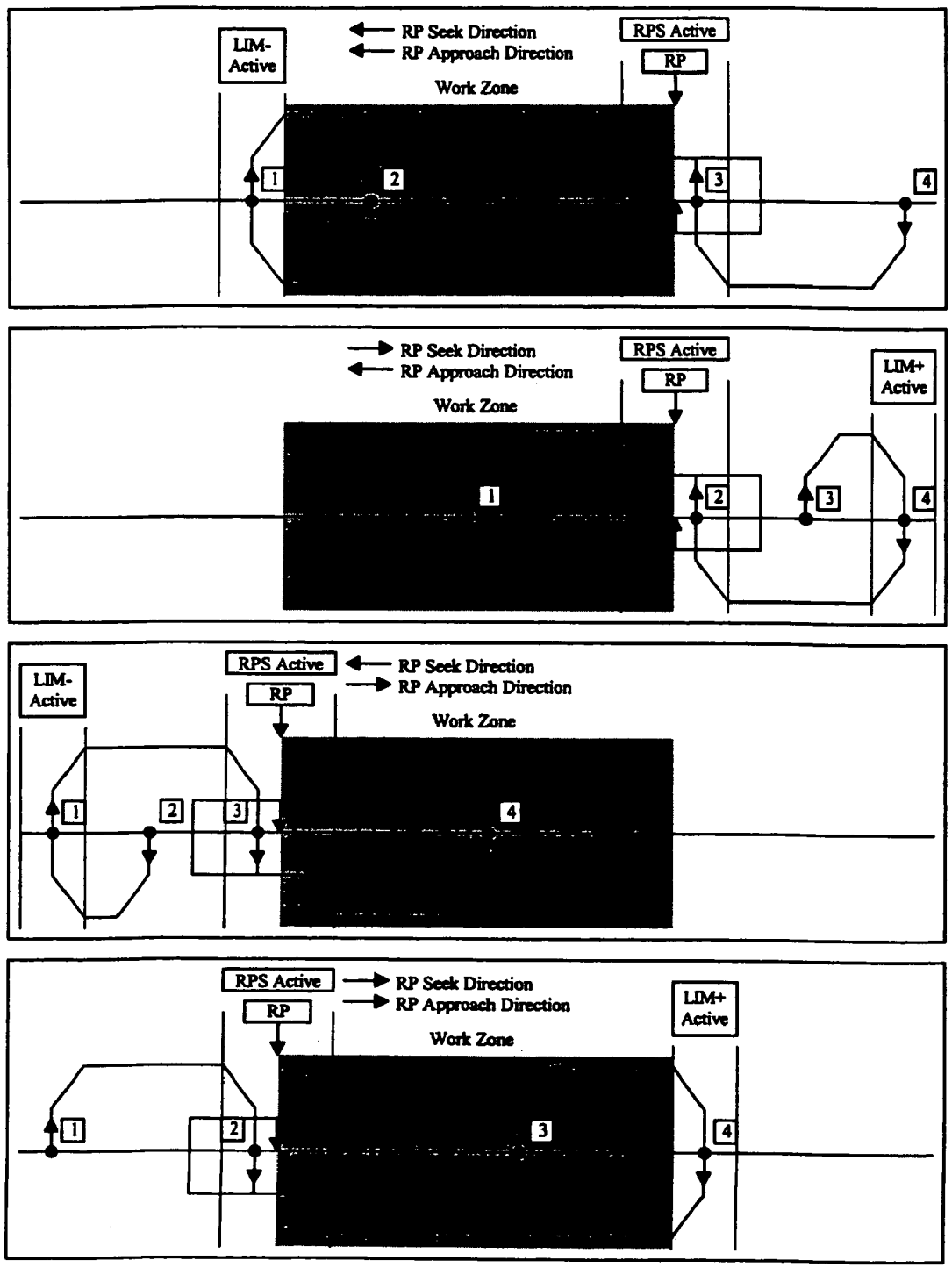
FIG. 8 is a reference point seek diagram of an exemplary motion module of the present invention.

The profile cache can be implemented as a FIFO queue, ordered according to the time a profile was last executed. When the user commands execution of a profile, that profile can become the newest entry, whether or not it previously existed in the cache. If the profile to be executed is not currently resident in the cache, then the resident profile with the longest period of time since it was last executed can be removed from the cache to make room for the newest profile. An example of cache behavior is shown in FIG. 4.

The module can manage the cache memory automatically without any intervention required by the user. If the user changes profile information for profiles that have already been executed, the user can be responsible for commanding a module reconfiguration. A module configuration command can cause the module to read the configuration information and empty the cache. If the user does not change any of the configuration information (only changes profile information), then the module can empty the cache.

The cache is not necessarily used for motion controlled from the Interactive Block. When the command to execute a motion is issued, the module can read the data contained within the Interactive Block to obtain the specifications of the move.

The following table defines the structure of the Configuration/Profile Table which can be located in V memory of the S7-200 PLC. This information can be accessible by the module, but typically can not be changed by the module. The Byte Offset column of the table can be the byte offset from the location pointed to by the configuration/profile area pointer.

The Type field for each entry can specify the numeric format of all the double word values. If the MEAS_SYS configuration value is set to Pulses, a double integer value (int) can be used. If the MEAS_SYS configuration value is set to Engineering Units, a floating point value (fp) can be used.

The ranges given in Table 2 for speed and position values are expressed in units of pulses per second and pulses, respectively. When using engineering units, conversion to either pulses per second or pulses can be required to verify that the value is within the allowed range. In absolute mode the position range is $-2^{31}$ to $2^{31} -1$. However, each position change in an interactive move or each step of a profile move can have a range of 1 to $2^{30}-1$ pulses, with the exception that a position change of 0 can be allowed for the initial step. For relative mode each position change in an interactive move or each step of a profile move can have a range of 1 to $2^{30}-1$ pulses.

TABLE 2

Configuration/Profile Table

| Byte Offset | Name | Function Description | Type |
|---|---|---|---|
| | | Configuration Block | |
| 0 | MOD_ID | Five ASCII characters that associate the configuration with a module type; default value for the stepper module is M253A" | — |
| 5 | CB_LEN | The length of the configuration block in bytes (1 byte) | — |
| 6 | IB_LEN | The length of the interactive block in bytes (1 byte) | — |
| 7 | PF_LEN | The length of a single profile in bytes (1 byte) | — |
| 8 | STP_LEN | The length of a single step in bytes (1 byte) | — |
| 9 | STEPS | The number of steps allowed per profile (1 byte) | — |
| 10 | PROFILES | Number of profiles from 0 to 64 (1 byte) | — |
| 11 | Reserved | This location is reserved for use by the library function. It should be initialized to a value of 0x0000 by the configuration wizard (2 bytes) | — |
| 13 | IN_OUT_CFG | Specifies the use of the module inputs and outputs (1 byte) | — |

| MSB | | | | | | | LSB |
|---|---|---|---|---|---|---|---|
| 7 | 6 | 5 | 4 | 3 | 2 | 1 | 0 |
| P/D | POL | 0 | 0 | STP | RPS | LMT- | LMT+ |

P/D - This bit selects the use of P0 and P1
    Positive Polarity (POL = 0)
        0 - P0 pulses for positive rotation
            P1 pulses for negative rotation
        1 - P0 pulses for rotation
            P1 controls rotation direction (0 - pos, 1 - neg)
    Negative Polarity (POL = 1)
        0 - P0 pulses for negative rotation
            P1 pulses for positive rotation
        1 - P0 pulses for rotation
            P1 controls rotation direction (0 - neg, 1- pos)

POL - This bit selects the polarity convention for P0 and P1; (0 - positive polarity, 1 - negative polarity)

STP    -Controls active level for stop input
RPS    -Controls active level for RPS input
LMT-    -Controls active level for negative travel limit input
LMT+ -Controls active level for positive travel limit input 0 - active high
1 - active low TABLE 2-continued Configuration/Profile Table

| Byte Offset | Name | Function Description | Type |
|---|---|---|---|
| 14 | STP_RSP | Specifies the drive's response to the STP input (1 byte)<br>Selection  Description<br><br>0           No action, ignore input condition<br>1           Decelerate to a stop and indicate STP input active<br>2           Terminate pulses and indicate STP input<br>3 to 255    Reserved (error if specified) | — |
| 15 | LMT−_RSP | Specifies the drive's response to the negative limit input (1 byte)<br>Selection  Description<br><br>0           No action, ignore input condition<br>1           Decelerate to a stop and indicate limit reached<br>2           Terminate pulses and indicate limit reached<br>3 to 255    Reserved (error if specified) | — |
| 16 | LMT+_RSP | Specifies the drive's response to the positive limit input (1 byte)<br>Selection  Description<br><br>0           No action, ignore input condition<br>1           Decelerate to a stop and indicate limit reached<br>2           Terminate pulses and indicate limit reached<br>3 to 255    Reserved (error if specified) | — |
| 17 | FILTER_TIME | Specifies the filter time for the STP, LMT−, LMT+, and RPS inputs (1 byte)<br><br>MSB                                              LSB<br>7   6   5   4   3   2   1   0<br>\| STP / LMT+ / LMT− \|      RPS        \|<br><br>Selection       Filter Response Time<br>'0000'          200 μsec<br>'0001'          400 μsec<br>'0010'          800 μsec<br>'0011'          1600 μsec<br>'0100'          1600 μsec<br>'0101'          3200 μsec<br>'0110'          6400 μsec<br>'0111'          12800 μsec<br>'1000'          No filter<br>'1001' to '1111'   Reserved<br>(error if specified) | — |
| 18 | MEAS_SYS | Specifies the measurement system used to describe moves (1 byte);<br>0 - pulses (speed measured in pulses/sec and position values measured in pulses - values are double integer)<br>1 - engineering units (speed measured in units/sec and position values measured in units - values are single precision real)<br>2 to 255 - reserved (error if specified) | — |
| 19 | — | Reserved - set to 0 (1 byte) | — |
| 20 | PLS/REV | Specifies the number of pulses per revolution of the motor, (only applicable when MEAS_SYS is set to 1) - (4 bytes)<br>Range: 1 to $2^{31} - 1$ | int |
| 24 | UNITS/REV | Specifies the engineering units per revolution of the motor, (only applicable when MEAS_SYS is set to 1) - (4 bytes)<br>Range: 0.0 to $3.402823 \times 10^{38}$ | fp |
| 28 | UNITS | Reserved for Micro/WIN to store a custom units string (4 bytes) | — |

TABLE 2-continued

Configuration/Profile Table

| Byte Offset | Name | Function Description | Type |
|---|---|---|---|
| 32 | RP_CFG | Specifies the reference point search configuration (1 byte)<br><br>MSB                                                LSB<br>7   6   5   4   3   2   1   0<br>[  |  | 0 | 0 |   MODE   ]<br>        └── RP_APPR_DIR<br>    └────── RP_SEEK_DIR<br><br>RP_SEEK_DIR - This bit specifies the starting direction for a reference point search (0 - positive direction, 1 - negative direction)<br><br>RP_APPR_DIR - This bit specifies the approach direction for terminating the reference point search (0 - positive direction, 1 - negative direction)<br><br>MODE - Specifies the reference point search method<br>'0000' - Reference point search disabled<br>'0001' - The reference point is where the RPS input goes active.<br>'0010' - The reference point is centered within the<br>'0011' - The reference point is outside the active<br>'0100' - The reference point is within the active region of the RPS input.<br>'0101' to '1111' - Reserved (error if selected) | — |
| 33 | — | Reserved - set to 0 | — |
| 34 | RP_ZP_CNT | Number of pulses of the ZP input used to define the reference point (4 bytes) Range: 1 to $2^{31} - 1$ | int |
| 38 | RP_FAST | Reference point seek speed - fast; (4 bytes) Range: MIN_SPEED to MAX_SPEED | int/fp |
| 42 | RP_SLOW | Reference point seek speed - slow; maximum speed from which the motor can instantly go to a stop or less (4 bytes) Range: MIN_SPEED to RP_FAST | int/fp |
| 46 | SS_SPEED | The starting speed is the maximum speed to which the motor can instantly go from a stop and the maximum speed from which the motor can instantly go to a stop. Operation below this speed is allowed, but acceleration/deceleration times do not apply. (4 bytes) Range: MIN_SPEED to MAX_SPEED | int/fp |
| 50 | MAX_SPEED | Maximum operating speed of the motor (4 bytes) Range: 0 to 200 K pps | int/fp |
| 54 | JOG_SPEED | Jog speed; (4 bytes) Range: MIN_SPEED to MAX_SPEED | int/fp |
| 58 | JOG_INCREMENT | The jog increment value is the distance (or number of pulses) to move in response to a single jog pulse. (4 bytes) Range: 1 to $2^{30} - 1$ | int/fp |
| 62 | ACCEL_TIME | Time required to accelerate from minimum to maximum speed in msec (4 bytes) Range: 20 ms to 32000 ms | int |
| 66 | DECEL_TIME | Time required to decelerate from maximum to minimum speed in msec (4 bytes) Range: 20 ms to 32000 ms | int |
| 70 | BKLSH_COMP | The backlash compensation value is the distance used to compensate for the system backlash on a direction change (4 bytes) Range: 0 to $2^{30} - 1$ | int/fp |
| 74 | JERK_TIME | Time during which jerk compensation is applied to the beginning and ending portions of an acceleration/deceleration curve (S-curve). Specifying a value of 0 disables jerk compensation. The jerk time is given in msec. (4 bytes) Range: 0 ms to 32000 ms | int |
| | | Interactive Block | |
| 78 | MOVE_CMD | Selects the mode of operation (1 byte)<br>0 -   Absolute position<br>1 -   Relative position<br>2 -   Single-speed, continuous positive rotation<br>3 -   Single-speed, continuous negative rotation<br>4 -   Manual speed control, positive rotation | — |

TABLE 2-continued

Configuration/Profile Table

| Byte Offset | Name | Function Description | Type |
|---|---|---|---|
| | | 5 - Manual speed control, negative rotation | |
| | | 6 - Single-speed, continuous positive rotation with | |
| | | 7 - Single-speed, continuous negative rotation with | |
| | | 8 to 255 - Reserved (error if specified) | |
| 79 | — | Reserved - set to 0 (1 byte) | — |
| 80 | TARGET_POS | The target position to go to in this move (4 bytes) Range: See Note 1 | int/fp |
| 84 | TARGET_SPEED | The target speed for this move (4 bytes) Range: MIN_SPEED to MAX_SPEED | int/fp |
| 88 | RP_OFFSET | Absolute position of the reference point (4 bytes) Range: $-2^{31}$ to $2^{31} - 1$ | int/fp |

As shown in Table 3, the Profile Block Section of the Configuration/Profile Table can contain from 0 to 64 move profiles. If more than 64 move profiles are needed, the user can bear the burden of exchanging Configuration/Profile Tables, by changing the value stored in the configuration/profile table pointer.

Command Byte

The module can provide one byte of discrete outputs, which can be used as the command byte. The command byte can have the following definition, in which R: 0=idle, 1=excute command specified in command_code, as shown Table 4, below.

TABLE 3

| Byte Offset | PF # | Step # | Name | Function Description | Type |
|---|---|---|---|---|---|
| | | | | Profile Blocks | |
| 92 (+0) | 0 | | STEPS | Number of steps in this move sequence (1 byte) | — |
| 93 (+1) | | | MODE | Selects the mode of operation for this profile block (1 byte) 0 - Absolute position 1 - Relative position 2 - Single-speed, continuous positive rotation 3 - Single-speed, continuous negative rotation 4 - Reserved (error if specified) 5 - Reserved (error if specified) 6 - Single-speed, continuous positive rotation with triggered stop (RPS input signals stop) 7 - Single-speed, continuous negative rotation with triggered stop (RFS input signals stop) 8 - Two-speed, continuous positive rotation (RPS selects speed) 9 - Two-speed, continuous negative rotation (RPS selects speed) 10 to 255 - Reserved (error if specified) | — |
| 94 (+2) | | 0 | POS | Position to go to in move step 0 (4 bytes) Range: See Note 1 above | int/fp |
| 98 (+6) | | | SPEED | The target speed for move step 0 (4 bytes) Range: MIN_SPEED to MAX_SPEED | int/fp |
| 102 (+10) | | 1 | POS | Position to go to in move step 1 (4 bytes) Range: See Note 1 above | int/fp |
| 106 (+14) | | | SPEED | The target speed for move step 1 (4 bytes) Range: MIN_SPEED to MAX_SPEED | int/fp |
| 110 (+18) | | 2 | POS | Position to go to in move step 2 (4 bytes) Range: See Note 1 above | int/fp |
| 114 (+22) | | | SPEED | The target speed for move step 2 (4 bytes) Range: MIN_SPEED to MAX_SPEED | int/fp |
| 118 (+26) | | 3 | POS | Position to go to in move step 3 (4 bytes) Range: See Note 1 above | int/fp |
| 122 (+30) | | | SPEED | The target speed for move step 3 (4 bytes) Range: MIN_SPEED to MAX_SPEED | int/fp |
| 126 (+34) | 1 | | STEPS | | — |
| 127 (+35) | | | MODE | | — |
| 128 (+36) | | 1 | POS | | int/fp |
| 132 (+40) | | | SPEED | | int/fp |

TABLE 4

|   | MSB | | | | | | | LSB |
|---|---|---|---|---|---|---|---|---|
|   | 7 | 6 | 5 | 4 | 3 | 2 | 1 | 0 |
| QBx | R | command_code | | | | | | | command_code:

| | |
|---|---|
| 000 0000 to 011 1111 | Command 0-63, Execute motion specified in Profile Blocks 0-63 |
| 100 0000 to 111 0101 | Command 64-117, reserved (error if specified) |
| 111 0110 | Command 118, Activate the DIS output |
| 111 0111 | Command 119, De-activate the DIS output |
| 111 1000 | Command 120, Pulse the CLR output |
| 111 1001 | Command 121, Reload current position |
| 111 1010 | Command 122, Execute motion specified in the Interactive Block |
| 111 1011 | Command 123, Capture reference point offset |
| 111 1100 | Command 124, Jog positive rotation |
| 111 1101 | Command 125, Jog negative rotation |
| 111 1110 | Command 126, Seek to reference point position |
| 111 1111 | Command 127, Reload configuration |

An interrupt can be generated on each rising edge of the R bit as an indication that a new command for profile execution has been received. Likewise, an interrupt can be generated on each falling edge of the R bit indicating a transition to an idle condition. Module firmware can have the ability to disable this interrupt.

If the module detects a transition to idle (R bit changes state to 0) while a command is active, then the operation in progress can be aborted and, if a motion is in progress, then a decelerated stop can be performed. Once an operation has completed, the module can require a transition to idle before a new command will be accepted. If an operation is aborted, then the module can complete any deceleration before a new command will be accepted. Any change in the command_code value while a command can be active can be ignored.

The motion module's response to a PLC mode change or fault condition can be governed by the effect that the PLC exerts over the discrete outputs according to the existing definition of the PLC function. Potential module reactions are described below:

(a) The PLC changes from STOP to RUN: The operation of the module is controlled by the user program.
(b) The PLC changes from RUN to STOP: The user can select the state that the discrete outputs are to go to on a transition to STOP or that the outputs are to retain their last state. Therefore, the following possibilities exist:
  1. The R bit is turned OFF when going to STOP—any motion in progress can be decelerated to a stop.
  2. The R bit is turned ON when going to STOP—if a motion was in progress, it can be completed; if no motion was in progress, then the profile specified by the ID bits can be executed.
  3. The R bit is held in its last state—any motion in progress can be completed.
(c) The PLC detects a fatal error and turns OFF all discrete outputs—any motion in progress can be decelerated to a stop; further movement can be prevented as long as the XA_OD signal remains active.
(d) The motion module can implement a watchdog timer that will turn the outputs OFF in the event that communication with the PLC is lost. In the event that the output watchdog timer expires any motion in progress can be decelerated to a stop.
(e) In the event that the motion module detects a fatal error in the module's H/W or firmware, the P0, P1, DIS and CLR outputs can be set to the inactive state.

Command 0-63, Execute Motion Specified in Profile Block 0-63

Execution of this command can cause the module to perform the motion operation specified in the MODE field of the Profile Block indicated by the command_code portion of the command. The specifications for Interactive Block motion operations typically are not cached, so they can be read each time that the module receives this command.

In mode 0 (absolute position) the motion profile block can define from one to four steps with each step containing both the position (POS) and speed (SPEED) that describes the move segment. The POS specification can represent an absolute location, which is based on the location designated as reference point. The direction of movement can be determined by the relationship between the current position and the position of the first step in the profile. In a multi-step move a reversal of direction of travel can be prohibited and can result in an error condition being reported.

In mode 1 (relative position) the motion profile block can define from one to four steps with each step containing both the position (POS) and the speed (SPEED) that describes the move segment. The sign of the position value (POS) can determine the direction of the movement. In a multi-step move, a reversal of direction of travel can be prohibited and can result in the reporting of an error condition.

In the single-speed, continuous speed modes (2 and 3), the position (POS) specification can be ignored and the module can accelerate to the speed specified in the SPEED field of the first step. Mode 2 can be used for positive rotation and mode 3 can be used for negative rotation.

In the single-speed, continuous speed modes with triggered stop (6 and 7) and RPS inactive, the module can accelerate to the speed specified in the SPEED field of the first step. If and when the RPS input becomes active, movement can stop after completing the distance specified in the POS field of the first step. If the POS=0, then the movement can decelerate to a stop without regard to the distance traveled. Mode 6 can be used for positive rotation and mode 7 can be used for negative rotation.

In modes 8 and 9, the binary value of the RPS input can select one of two continuous speed values as specified by the first two steps in the profile block. Mode 8 can be used for positive rotation and mode 9 can be used for negative rotation. The SPEED can control the speed of movement. The POS values can be ignored in this mode. The following table defines the relationship between the inputs and the step within the profile block.

| RPS | Description |
|---|---|
| No current flow | Step 0 controls the speed of the drive |
| Current flow | Step 1 controls the speed of the drive |

Command 118, Activate the DIS Output

Execution of this command can result in the activation of the DIS output.

Command 119, De-activate the DIS Output

Execution of this command can result in the de-activation of the DIS output.

Command 120, Pulse the CLR Output

Execution of this command can result in the issuance of a 50 ms pulse on the CLR output.

Command 121, Reload Current Position

Execution of this command can cause the module to read the value found in the TARGET_POS field of the Interactive Block and set the current position to that value.

Command 122, Execute Motion Specified in the Interactive Block

Execution of this command can cause the module to perform the motion operation specified in the MOVE_CMD field of the Interactive Block. The specifications for Interactive Block motion operations typically are not cached, so they can be read each time that the module receives this command.

In the absolute and relative motion modes (0 and 1), a single step motion can be performed based upon the target speed and position information provided in the TARGET_SPEED and TARGET_POS fields of the Interactive Block.

In the single-speed, continuous speed modes (2 and 3), the position specification can be ignored and the module can accelerate to the speed specified in the TARGET_SPEED field of the Interactive Block.

In the manual speed control modes (4 and 5), the position specification can be ignored and the user program can load the value of speed changes into the TARGET_SPEED field of the Interactive Block. The motion module can continuously monitor this location and respond appropriately when the speed value changes.

In the single-speed, continuous speed modes with triggered stop (6 and 7) and RPS inactive, the module can accelerate to the speed specified in the SPEED field of the first step. If and when the RPS input becomes active, movement can stop after completing the distance specified in the POS field of the first step. If the POS=0, then the movement can decelerate to a stop without regard to the distance traveled. Mode 6 can be used for positive rotation and mode 7 can be used for negative rotation.

Command 123, Capture Reference Point Offset

Execution of this command can allow for the establishment of the zero position that is at a different location from the reference point position.

Before this command is issued, the reference point position can be determined and the user can jog the machine to the work starting position. Upon receiving this command, the module can compute the offset between the work starting position (the current position) and the reference point position and write that computed offset to the RP_OFFSET field of the Interactive Block. Then, the current position can be set to 0. This can establish the work starting position as the zero position.

In the event that the stepper motor loses track of its position (power is lost, the stepper motor is repositioned manually, etc.) the Seek to Reference Point Position command can be issued to re-establish the zero position automatically.

Command 124, Jog Positive Rotation

This command can allow the user to manually issue pulses for moving the stepper motor in the positive direction.

If the command remains active for less than 0.5 seconds, the motion module can issue the number of pulses specified in JOG_INCREMENT while accelerating to the JOG_SPEED. If the command remains active for 0.5 seconds or longer, the motion module can begin to accelerate to the specified JOG_SPEED. Once a transition to idle is detected, the module can decelerate to a stop.

Command 125, Jog Negative Rotation

This command can allow the user to manually issue pulses for moving the stepper motor in the negative direction.

If the command remains active for less than 0.5 seconds, the motion module can issue the number of pulses specified in JOG_INCREMENT while accelerating to the JOG_SPEED. If the command remains active for 0.5 seconds or longer, the motion module can begin to accelerate to the specified JOG_SPEED. Once a transition to idle is detected, the module can decelerate to a stop.

Command 126, Seek to Reference Point Position

Execution of this command can initiate a reference point seek operation using the specified search method. When the reference point has been located and motion has stopped, then the module can load the value read from the RP_OFFSET field of the Interactive Block into the current position.

Command 127, Reload Configuration

Execution of this command can cause the module to read the configuration/profile table pointer from the appropriate location in SM memory. The module then can read the Configuration Block from the location specified by the configuration/profile table pointer. The module can compare the configuration data just obtained against the existing module configuration and perform any required setup changes or recalculations. Any cached profiles can be discarded.

Reference Point Definition

The location known as the reference point can have one of several pre-defined sequences of module input conditions. The user can select the definition of the reference point that most closely matches the needs of the application. Once the user has selected a definition for the reference point and configured the module accordingly, the user can issue the seek reference point command. In response to this command, the module can automatically seek the reference point position, stop at the reference point and activate the CLR output for a period of 50 msec.

Potential definitions of the reference point that the user can choose from are listed below (the number of options are multiplied by four when all combinations of the RP_SEEK_DIR and RP_APPR_DIR specifications are included):

a) Mode 1: The reference point can be where the RPS input goes active on the approach from the work zone side.
b) Mode 2: The reference point can be centered within the active region of the RPS input.
c) Mode 3: The reference point can be located outside the active region of the RPS input. RP_Z_CNT can specify how many zero pulse counts on the ZP input to move after the RPS input goes inactive.
d) Mode 4: The reference point can be most likely located within the active region of the RPS input. RP_Z_CNT can specify how many zero pulse counts on the ZP input to move after the RPS input goes active.

FIGS. 5-8 are reference point seek diagrams for Modes 1-4, respectively. These reference point seek diagrams illustrate the definition of the reference point and the sequence of finding the reference point.

For FIGS. 5-8, the work zones have been located so that moving from the reference point to the work zone requires movement in the same direction as the RP Approach Direction. By selecting the location of the work zone in this way all the backlash of the mechanical gearing system can be removed for the first move to the work zone after a reference point seek.

Figure 9:
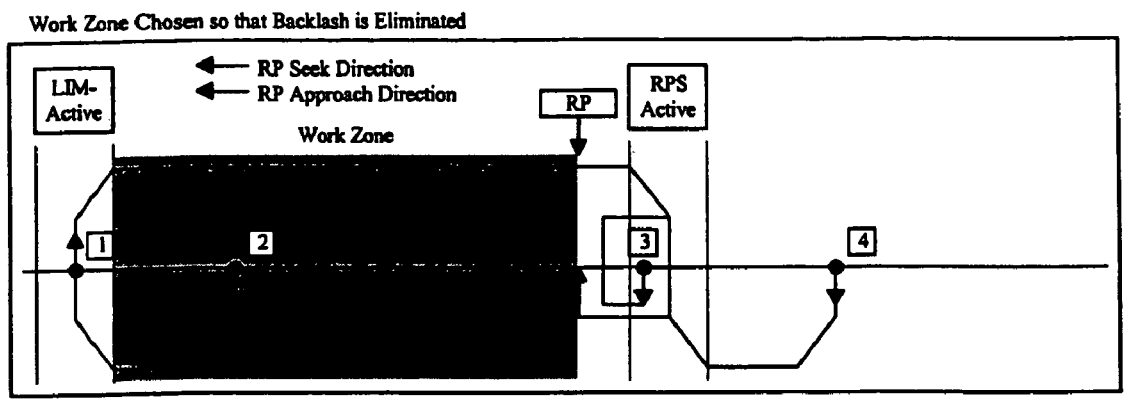
FIG. 9 is two reference point seek diagrams of an exemplary motion module of the present invention.
Figure 9:
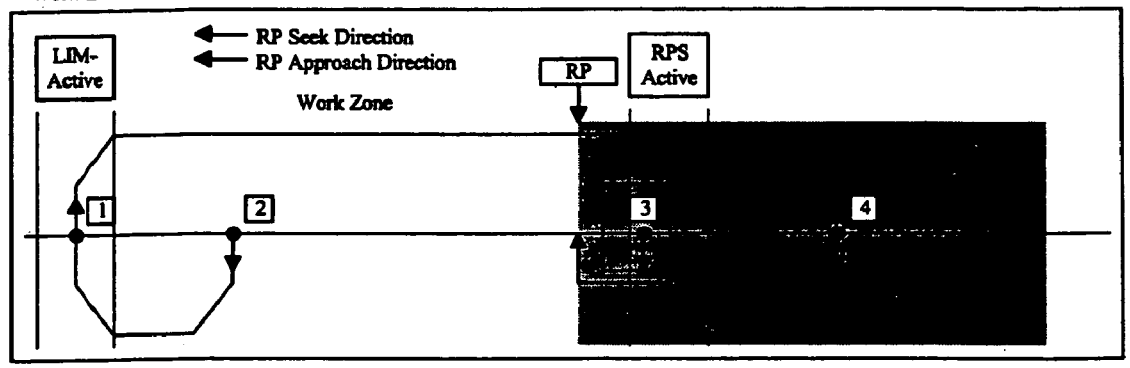

FIG. 9 includes two reference point seek diagrams, the upper showing the work zone in relationship to the RPS and LIM+ switches for an approach direction that can eliminate the backlash. The lower diagram places the work zone so that the backlash is not necessarily eliminated. A similar placement of the work zone is possible, although not recommended, for each of the possible search sequences in each of Modes 1-4.

User Interface

Table 5 shows the inputs, outputs and status LED's for the module.

TABLE 5

| Local I/O | LED | Color | Function Description |
|---|---|---|---|
| — | MF | Red | The module fault LED shall be illuminated when the module detects a fatal error |
| — | MG | Green | The module good LED shall be illuminated when there is no module fault and shall flash at a 1 Hz rate when a configuration error is detected |
| — | PWR | Green | The user power LED shall be illuminated when 24 VDC is supplied on the L+ and M terminals of the module |
| Input | STP | Green | Illuminated when there is current flow in the stop input circuit |
| Input | RPS | Green | Illuminated when there is current flow in the reference point switch input circuit |
| Input | ZP | Green | Illuminated when there is current flow in the zero pulse input circuit |
| Input | LMT− | Green | Illuminated when there is current flow in the negative limit input circuit |
| Input | LMT+ | Green | Illuminated when there is current flow in the positive limit input circuit |
| Output | P0 | Green | Illuminated when the P0 output is pulsing |
| Output | P1 | Green | Illuminated when the P1 output is pulsing or indicating direction. (see the description of the IN_OUT_CFG field in the Configuration/Profile Table) |
| Output | DIS | Green | Illuminated when the DIS output is active |
| Output | CLR | Green | Illuminated when the clear deviation counter output is active |

Figure 10:
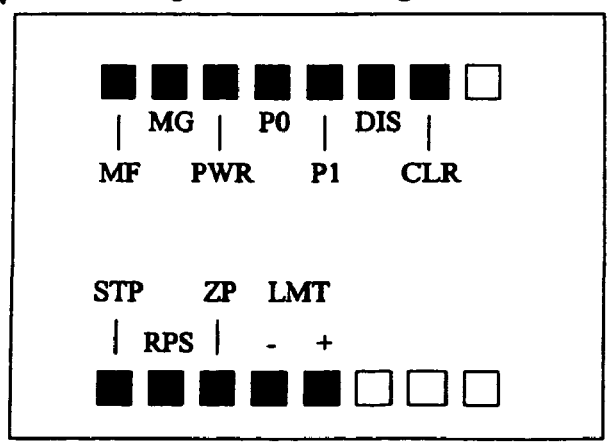
FIG. 10 is a block diagram showing an exemplary arrangement and labeling of LED's of an exemplary motion module of the present invention.
Figure 11:
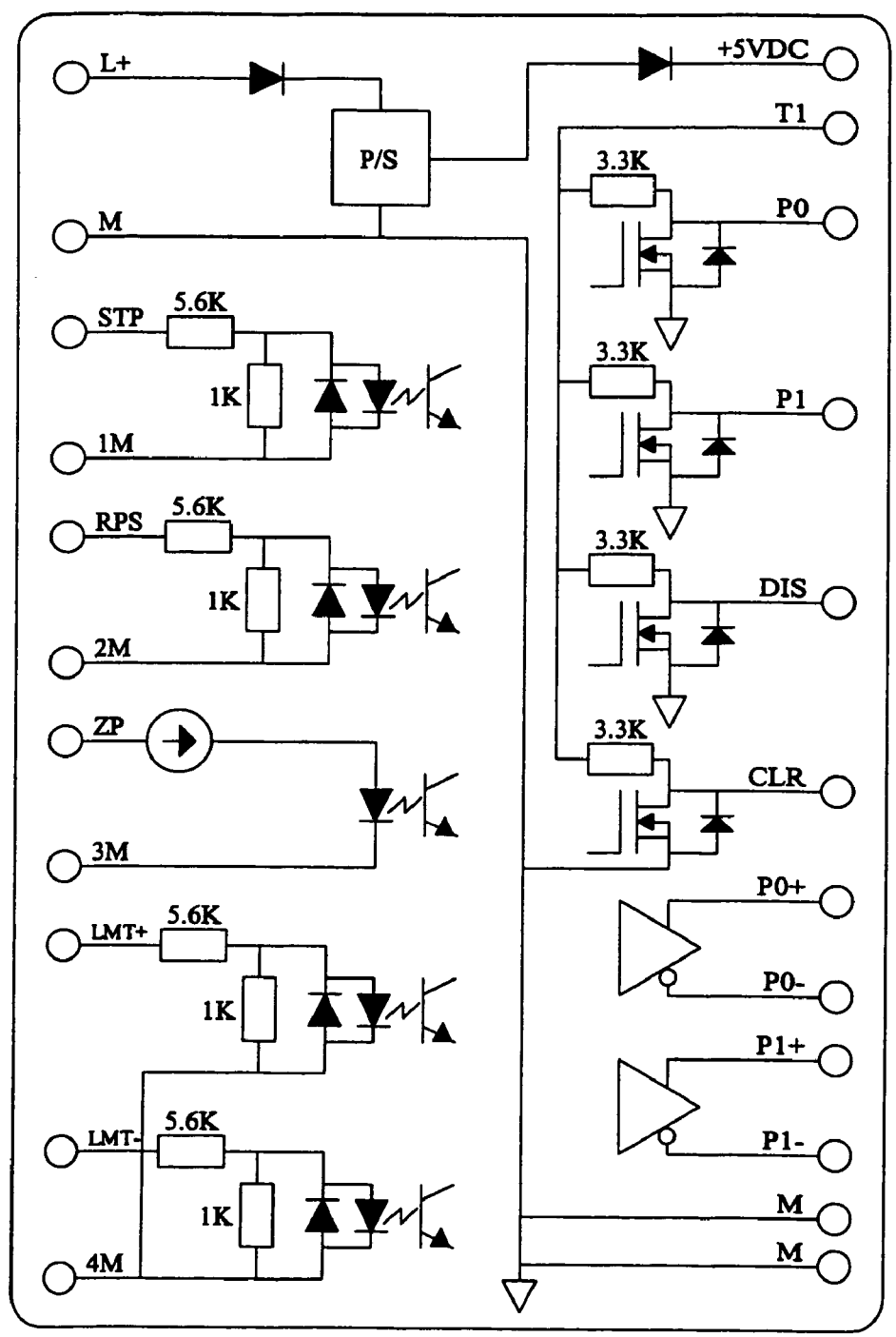
FIG. 11 is a circuit diagram showing exemplary circuits for inputs and outputs and the associated user power terminals of an exemplary motion module of the present invention.

FIG. 10 is a block diagram showing an exemplary arrangement and labeling of LED's of an exemplary motion module of the present invention. FIG. 11 is a circuit diagram showing exemplary circuits for inputs and outputs and the associated user power terminals of an exemplary motion module of the present invention. This figure is a schematic representation and does not reflect the order of the terminal block screws.

The module's specification for the inputs and outputs are shown in Table 6. The operation of open drain outputs above 5VDC might increase radio frequency emissions above permissible limits. Radio frequency containment measures might be required for certain systems or wiring. Depending on the pulse receiver and cable, an additional external pull up resistor might improve pulse signal quality and noise immunity.

TABLE 6

| Description | Specification | |
|---|---|---|
| Power Supply | | |
| Input Supply Voltage | 11-30 VDC | |
| Input Supply Current (5 VDC ± 10%) | | |
| Load Current | 12 VDC Input | 24 VDC Input |
| 0 mA (no load) | 120 mA, max | 70 mA, Max |
| 200 mA (rated load) | 300 mA, max | 130 mA, max |
| current limit (0.5 to 1.5 A) | 700 mA, max | 350 mA, max |
| Isolation Tested Value (Input Power to Logic) (Input Power to Inputs) | 500 VAC for 1 minute | |
| Reverse Polarity: | on L+ input power and on +5 VDC output power | |
| Input Voltage Maximum Continuous Permissible | | |
| STP, RPS, LMT+, LMT− | 30 VDC | |
| ZP | 30 VDC at 20 mA, maximum | |
| Surge | 35 VDC for 0.5 sec | |
| Rated Value | | |
| STP, RPS, LMT+, LMT− | 24 VDC at 4 mA, nominal | |
| ZP | 24 VDC at 15 mA, nominal | |
| Logic "1" signal (minimum) | | |
| STP, RPS, LMT+, LMT− | 15 VDC at 2.5 mA, minimum | |
| ZP | 3 VDC at 8.0 mA, minimum | |
| Logic "0" signal (maximum) | | |
| STP, RPS, LMT+, LMT− | 5 VDC at 1 mA, maximum | |
| ZP | 1 VDC at 1 mA maximum | |
| Input Delay Times | | |
| STP, RPS, LMT+, LMT− | 0.2 to 12.8 msec, user selectable | |
| ZP | 2 μsec minimum | |

Figure 12:
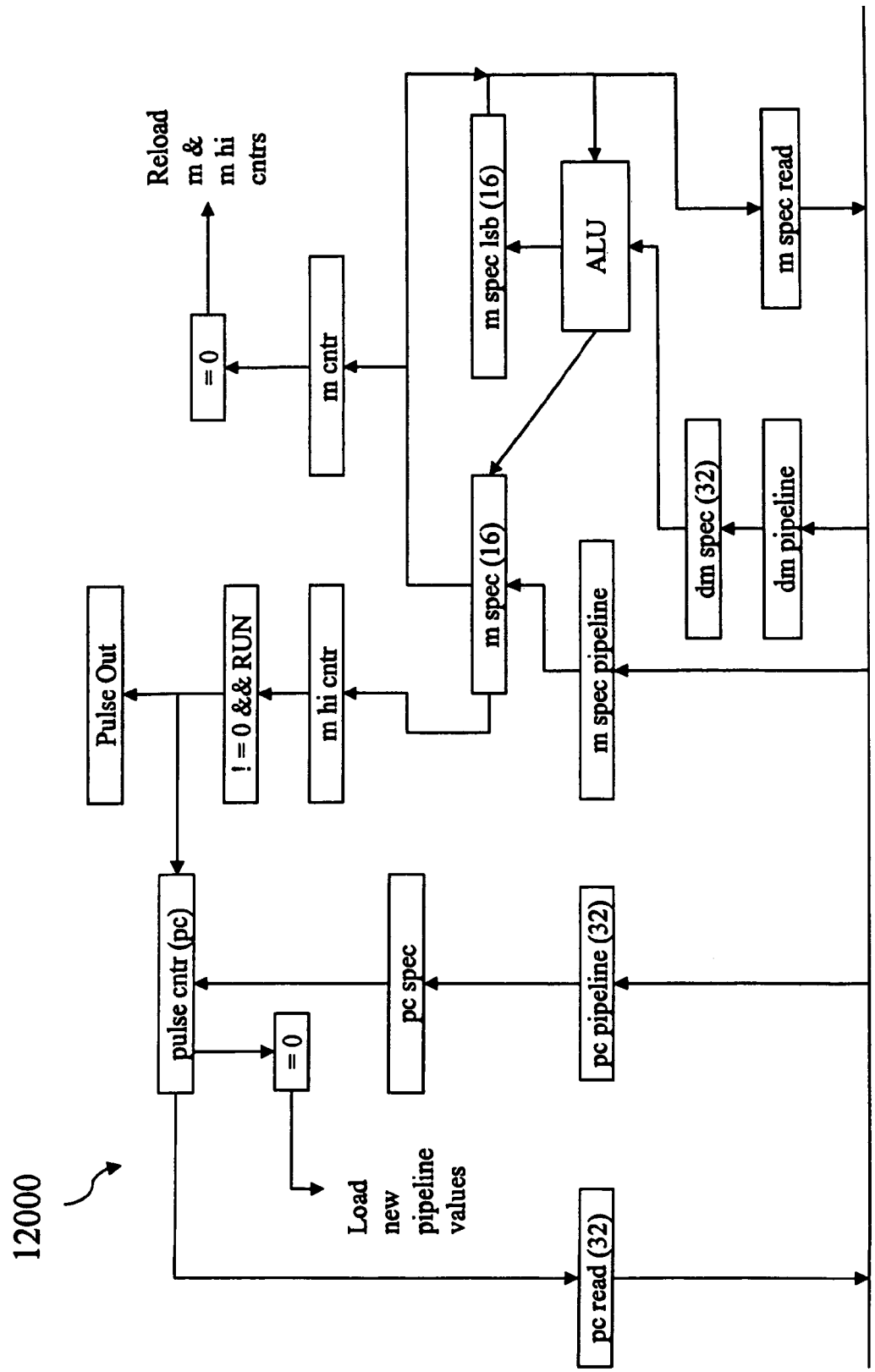
FIG. 12 is a pulse out generation block diagram for an exemplary embodiment of the motion module.

FIG. 12 is a pulse out generation block diagram for an exemplary embodiment of the motion module. Table 7 provides functional descriptions for various components of the motion module block diagram of FIG. 12.

TABLE 7

| Mnemonic CPU access | Description |
|---|---|
| m spec written via pipeline read back provided | pulse width specification, number of clocks per pulse. 15 bits + sign, sign bit set is an error |
| m spec lsb not accessible | 16 bit less significant bit extension of pulse width specification, accumulates fractional delta width changes |
| dm spec written via pipeline | 32 bit signed, fixed point delta m (delta pulse width) specification |
| m cntr not accessible | pulse width counter, loaded with m spec, counts down through 0 {(m + 1) clocks per pulse} |
| m hi cntr not accessible | loaded with right shift value of m spec, counts down through 0 pulse out is high when any bit is 1 (negligible asymmetry). |

TABLE 7-continued

| Mnemonic CPU access | Description |
|---|---|
| pulse counter (pc) not accessible | Counts on leading edge of each pulse, from loaded value down to 0. (n loaded to pc results in n pulses executed.) |
| pulse count spec (pc spec) written via pipeline | Value loaded to pulse count down counter, loaded from pipeline bits 31:30 of pulse count spec, in combination with RUN command, select last step and continuous run modes |
| pc[31:30] write via pipeline run_mode | spec and pipeline copies spec copy specifies current operation as: 00 - do nothing/STOP 01 - run by steps, pc counts down to 0, then loads new dm and pc from pipeline 10 - run continuous, pc counts down . . . may roll over 11 - last step, pc counts down to 0, then stops After any stop, re-start requires the state machine must be brought to idle state by a STOP command, then a load of the pc and a xfr_pipeline to set up for next move. |
| pc pipeline write only | Value loaded to pc spec when pulse count = 0 or on xfr_pipeline. Initiating a run_steps operation with a pulse count specification of 0 is an error. |
| dm pipeline write only | value loaded to dm spec when pulse count compares to spec or on xfr_pipeline |
| m spec pipeline write only | value loaded to m spec when pulse count = 0 or on xfr_pipeline. Typically run time changes in pulse width are accomplished with the delta pulse width mechanism rather than direct loads of m pipeline. |
| pipeline refresh not accessible | Records for m, dm, pc pipeline values if new value available for load. Set for each register on write to lsb. NO values are transferred unless the pc lsb has been written. |
| xfr pipeline <no data> | Decode address on write only - forces load of dm, pc, and m pipelines to working registers if the pipelines have been updated. Used to set up working register + pipeline register for start up, or to escape from run continuous mode. Also used to escape from m overflow condition by forcing pipeline load to m, dm, and pc as required. Synchronized internally to be effective after current pulse completes. |
| pc read buf read only | Pulse count read buffer. |
| m read buf read only | copied from m_spec after each update. locked by msb read, released by lsb read. |
| trip counter lsb read only Reset state of all registers is 0. | probably not needed . . . divides down pulse count to rate that CPU ASIC can count if not 200 KHz (need to investigate) Address assignments 0:3 command/status registers 4:7 dm_pipe 8:B pc_pipe C:D m_pipe E:F unused 10 xfr_pipeline 11 interrupt ack address 12 rps attributes 13:1B reserved 1C:1D m_spec read buffer 1E:1F m_spec read buffer overmap —28:2B pc_actual read buffer (deleted) |
| command register read/write, changed by both CPU and FPGA address C00 | bit Bits 0,1 are commands written from uP, read back as written, not changed by machine. Bits 2 . . . 5 reflect machine response. See sequence descriptions below. 7 Unused 6 RPS, after filter, 1 = current flow at input point 5 1 = accel_bar, action freezing pulse width, barring acceleration or deceleration 4 1 = active_pulse, indicates pulses are in progress starts with actual leading edge of 1$^{st}$ pulse persists until low time of last pulse is complete 3 1 = abort_ack Abort command processed, pipeline rupt and accel_bar valid. Exit from run_steps has been completed, exit from run_continuous is blocked. 2 1 = run_ack, transition to run state acknowledged by machine 1$^{st}$ pulse of current sequence is committed cleared during last pulse in finish or estop states 1 1 = abort_cmd, abort command from uP. Exit to abort state, thence to run_continuous if in run_steps. Block exit from run_continuous until cleared. 0 1 = run_cmd, run command from uP 0 = stop command from uP |

TABLE 7-continued

| Mnemonic CPU access | | Description |
|---|---|---|
| rps attribute register read/write address C12 | bit 7:5 | RPS filter: 0 = 2 us, 1 = 200 us, 2 = 400 us, 3 = 800 us, 4 = 1.6 ms 5 = 3.2 ms, 6 = 6.4 ms, 7 = 12.8 ms (physical delay of input point will add several microseconds) |
| | 4 | RPS_falling_edge: 1 = xfr_pipeline on rps falling edge |
| | 3 | RPS_rising_edge: 1 = xfr_pipeline on rps rising edge |
| | 2 | RPS pulse catch: 1 = capture next change in RPS. Allow no further changes in RPS_filt to uP until this bit is cleared. |
| | 1 | Spare |
| | 0 | Spare |
| direction attribute register read/write address C01 | bit 7:3 | spare |
| | 2 | clock source: 0 = sys clk<br>1 = external clock (CPU PCLK) |
| | 1 | dir mode: 0 = output 0 pulse for up, output 1 pulse for down<br>1 = output 0 pulsing, output 1 = 1 for up |
| bits [2:0] should not be changed during operation | 0 | dir: 0 = count up<br>1 = count down |
| Interrupt/ status register read only address C02 Interrupt mask register read/write address C03 Interrupt Ack Write only Address C11 | bit | FPGA svc_rqst interrupt = OR of all bits in this register that are selected (=1) by the interrupt mask register. Latched edge bits are cleared by write of 1 to the corresponding bits in the interrupt ack register. Status level bits must be cleared by appropriate corrective action. Changes in the mask do not change the prior state of latched edge bits, but will mask/unmask levels. |
| | 7 | pc underflow: Pulse down counter received a pulse while at zero value. CPU can note pc underflow and record if interested. Latched edge. This will happen routinely, for example, for a run steps transition to run continuous. |
| | 6 | m overflow/underflow: 1 = illegal result (negative number) occurred on attempt to apply dm to m. Refuse to load illegal value to m_spec, continue running constant m, last legal value. Status level. Requires change in m or dm pipe values and xfr_pipeline to load corrective m or dm from pipeline. |
| | 5 | pipeline starved: A transfer pipeline was requested (by a counted-pulse run step complete, an rps edge, or a commanded xfr) without a refreshed pc indicating a completed pipeline load. Block pipeline loads, continue running with last value. Latched edge. Note that clearing this bit clears the interrupt but does not alter the basic run time state machine, which is stuck on a run_step that will never complete. Recovery requires an abort command to escape from run_steps mode and a xfr_pipeline to load m, dm, and pc values as needed to start recovery step. |
| | 4 | RPS falling edge: 1 = an RPS falling edge has occurred, and has not been cleared by a write to the interrupt clear register. Latched edge. |
| | 3 | RPS rising edge: 1 = an RPS rising edge has occurred, and has not been cleared by a write to the interrupt clear register. Latched edge. |
| | 2 | Qx.7 falling edge: 1 = falling edge on Qx.7 in the dual port RAM since the last clear of this bit by a write to the interrupt clear register. Latched edge.<br>(QBx = Page 0, R12 from bus or DP-RAM address 4 in Slave space) |
| | 1 | Qx.7 rising edge: 1 = rising edge on Qx.7 in the dual port RAM since the last clear of this bit by a write to the interrupt clear register. Latched edge.<br>(QBx = Page 0, R12 from bus or DP-RAM address 4 in Slave space) |
| | 0 | pipeline empty: 1 = there are no registers currently refreshed and available for pipeline transfer. Note this bit = 0 if ANY pipeline register is refreshed. Refresh is posted on lsb write. Status level. |
| Q refresh detect C13 | 7 | Bit 7 is set on any write to Q from slave interface. Bit 7 is cleared by any write from the local processor. Note that the Qx.7 rising edge/falling edge interrupt action can be determined by the state of a Qx.7 flip flop in the em bus slave hardware, not by the value of the bit in the dual port RAM. Writes to Qx from the uP bus might result in apparently inconsistent operation. |

State Diagram

A state diagram for the motion module can include the following variables:

run_q: qualified run command, command register content changes are recognized at chosen safe times—generally in sub-states below the top level diagram.
X0=stop
01=run
11=abort
modes from pc(31:30)
run_steps, last_step, run_cont (continuous), mode_stop
xfr_pipeline: command to load refreshed pipe values to working registers, commanded by CPU or RPS edge.
run_cld: run instruction to pulse generator state machine.
X0=stop
01=run
11=abort
pc_capture_time: a timing strobe, name comes from original use to identify when pulse counter contents are stable for read/capture. Now used only for state transition timing.

States:
idle: do nothing, exit on xfr_pipeline command to init_load.
init_load: move initial pipeline values to working registers, wait for run command to transition.
   return to idle if stop command or mode stop
   go to run_a_step to start a stepped profile
   go to run_continuous for steady speed operation
run_a_step: enable pulse machine, set run_ack, periodically examine pulse count & run command, exit on:
   if run command=stop, exit to estop
   if run command=abort, exit to abort
   when pulse count=0, exit to pipe_load or finish as chosen by run_steps or last_step
pipe_load: load refreshed pipe values to working registers, examine new pc[31:30] to determine next state:
   return to run_a_step to continue a stepped profile
   go to run_continuous for steady speed operation
   go directly to finish
   if pc not refreshed, clear all pipe refresh flags and return to source state
run_continuous: enable pulse machine, acknowledge run or abort command, periodically examine run command and xfr_pipeline.
   on xfr_pipeline go to pipe_load for new information
   if run command=stop, exit to estop
   abort: instruct pulse machine to freeze pulse width, go to run_continuous
estop: disable pulse machine ability to start new pulses, clear run_ack, exit to idle on pulse complete.
finish: disable pulse machine ability to start new pulses, clear run_ack, exit to idle on pulse complete and run command=stop.

Certain potential operating sequences for the pulse generator module are shown in Table 8, below.

TABLE 8

| Processor | FPGA |
|---|---|
| NORMAL STEPPED RUN SEQUENCE pc_spec[31:30] = run by steps | |
| | Start from reset --- all command registers cleared. Pipeline and spec data registers unknown. (Some may be RAM, not easily initialized.) |
| Write attribute register with direction selections. | Sets pulse up/down and direction on pulse_out[1:0] |
| Write m, dm, pc pipelines. | Note pipeline refresh per each value lsb. |
| Write xx to xfr_pipeline address. | Transfer pipeline values for written registers to spec registers. Clear pc. |
| Write dm, pc pipeline. | Note pipeline refresh on lsb write of each value. |
| Write run_cmd <= 1 | load m_spec to pulse width counter start pulse out, set run_ack bit during each pulse, m_spec<=m +dm at end of each pulse pc-=1, m_cntr<=m_spec when pc= 0, load fresh values from pipeline (will not load unless new value in pipe) clear pipeline refresh flags set pipeline empty interrupt |
| Write dm, pc pipeline. | Note pipeline refresh on lsb write of each value. |
| Write to rupt_ack address | Clear interrupt. |
| CPU can check status by reading run_ack = 1 to indicate started active_pulse = 1 to indicate still running error register (see below) m_spec (pulse width) pc (pulse count) msb read latches consistent word/long value | Continue pulse out and pipeline loads as above until pc[31:30] in spec register indicate last step. when last step and pc=pc_spec run_ack <= 0 stop pulse out do not clear pc active_pulse <= 0 when last pulse complete |
| write run_cmd <= 0 | return to idle state, ready to start new sequence |

TABLE 8-continued

| Processor | FPGA |
|---|---|
| Stepped Run ABORT | |
| Write abort_cmd <= 1 | ABORT recognized on next pulse rising edge. All pipeline loads inhibited. New pipeline request interrupt inhibited. pulse width changes inhibited, on following falling edge, dm_bar <= 1. On second pulse rising edge, abort_ack <= 1 to indicate transition complete. (note this could violate S curve $2^{nd}$ derivative limits, but less severe than derivative sign reversal) |
| Reads m_spec, checks status of pipeline request interrupt, infers dm_spec loads corrective action dm, pc, etc | |
| clear ABORT bit to re-enable xfr_pipeline | on next pulse |
| writes xx to xfr_pipeline address | transfers new pipeline data to spec registers |
| | continues running in normal RUN state |
| CONTINUOUS RUN SEQUENCE | |
| cpu has loaded pc_spec[31:30] = run_continuous to pipeline after accelerating in a stepped run sequence. | In RUN mode already, pipeline request interrupt asserted. Runs pulses per pipelined specs for m, dm. pc counts up continuously, with no pipeline loads. pc overflow posts error bit and interrupt to allow CPU to count roll-overs. |
| writes next values of m, dm, etc. | notes refreshed pipeline values |
| write xx to rupt_ack address | clears pipeline request interrupt continues to run per m, dm specs. pc continues to count up. No further pipeline loads or rupts. |
| write xx to xfr_pipeline address | On next pulse, xfr refreshed pipeline values. Run per new values m, dm, pc, etc |
| Monitor status, change speed (m) etc on the fly by loading pipeline and xfr_pipeline commands. | Responds to xfr pipeline commands, otherwise runs with no change. |
| Based on whatever criteria, decides to start deceleration. | |
| Write dm, pc pipelines with values for first step of deceleration to come. | |
| pc[31:30] in pipeline will typically = run by steps | |
| write xx to xfr_pipeline address | On next pulse, xfr refreshed pipeline values. Run per new values m, dm, pc, etc, including new pc[31:30] which typically will change mode back to run by steps. |
| E-STOP | |
| Write command register to STOP. | Current pulse completes. Then pulse stops. |
| CPU can check status per above. | pc and m_spec not changed. |

For certain motion modules, potential CPU ASIC pin assignments and address mapping are provided in Table 9, below:

TABLE 9

| CPU Pin Function | Motion Module Usage |
|---|---|
| Non-Volatile CS | Up to 256 KB Flash or OTP. 42096 bytes of this storage will be required to load the FPGA program. |
| RAM CS | 32 KB RAM |
| Free Chip Select | Motion FPGA<br>0:3FF + 800 = 800:BFF Intelligent Module DP RAM<br>C00: C1D Motion Register Space<br>0:3 command/status registers<br>0: command register<br>1: direction attributes register<br>2: interrupt/status register<br>3: interrupt mask register<br>4:7 dm_pipe<br>8:B pc_pipe |

TABLE 9-continued

| CPU Pin Function | Motion Module Usage |
|---|---|
| | C:D m_pipe |
| | E:F m_pipe overmap |
| | 10 xfr_pipeline (command on write) |
| | 11 interrupt ack (ack per bit in write byte) |
| | 12 rps attributes register |
| | 13 q refresh detector |
| | 14:1B reserved for additional readbacks |
| | 1C:1D m_spec read buffer |
| | 1E:1F m_spec read buffer overmap |
| | 28:2B pc_actual read buffer (deleted) |
| I0.0 | E-Stop (all inputs = 1 for power flow in input point) |
| I0.1 | Limit + |
| I0.2 | Limit − |
| I0.3 | Pulse up or pulse, input into High speed counter (4) of pulse events |
| I0.4 | Pulse down or direction, input into High speed counter (4) of pulse events. 1 = count up in pulse & direction mode. |
| I0.5 | User power OK |
| I0.6 | Pulse up or pulse: input to a High speed counter (1) of pulse events. |
| I0.7 | Pulse down or direction: input to a High speed counter(1) of pulse events. |
| I1.0 | (pulled up for no action) |
| I1.1 | RPS: gates high speed counter (1) for counting pulse out during RPS |
| I1.2 | Z-pulse/High speed counter (2) Z-pulse counter |
| I1.3 | FPGA Init. 1 = FPGA Configuration reset in progress or configuration error. Use pulse catch or handshake with Q1.1 to verify that a configuration reset occurred in response to Q1.1 toggle. |
| I1.4 | (pulled up for no action) |
| I1.5 | RPS: gates High speed counter (2) for counting Z pulse during RPS |
| Q0.0, Q0.1 | Spare |
| Q0.2 | User driven motor disable (1 = current flow in sinking output) |
| Q0.3 | Deviation counter clear (1 = current flow in sinking output) |
| Q0.4 | Module Good LED, 1 = LED ON |
| Q0.5 | spare |
| Q0.6 | Slave Enable, 1 = bus response enabled |
| Q0.7 | Motion Reset, 0 = Reset motion registers, counters, etc. |
| Q1.0 | Configuration Enable: 1 => write cycles to non-volatile chip select space load FPGA configuration data to FPGA. Load is sequential, 1 write per byte, for full 42096 bytes. (Other cycles may intervene, but each write to FPGA space increments internal address pointer). Motion module CPU reset = 200 ms max from power up. Spec delay from "power up" to Slave ready: 500 ms. Master cpu reset = 140 ms min. Time available for load = 140 + 500 − 200 = 440 ms. Estimated 86 ms required. |
| Q1.1 | Configuration Reset: 0 => Reset FPGA Configuration. Clears all FPGA configuration RAM, initializes RAM address pointer. Sense is chosen so that watchdog timeout clears FPGA. |
| Power Fail Pending | EM Bus Out Disable |
| Watch Dog In | 555 timer oscillator, clock time ~ 944 uS, range 600-1300 us. |
| INT4 | Motion service request |
| RXD/TXD | On jumper stakes for flash download communication. |
| PCLK | Alternate time base to motion pulse width counter for low speed operation. It is not intended that the time base be changed from 33 MHz to PCLK, or for PCLK to change in frequency, during pulses. |

Pulse Calculations

A number of motion scenarios can be visualized. One scenario of particular difficulty emerges when the distance an actuator is to travel is short and insufficient to achieve maximum speed. For this scenario, at least three cases can be recognized.

Generally, a linear slope can be defined by F_start, F_end (F0), and t_a (the acceleration time), such that the slope a=(F_end−F_start)/t_a.

Also, n_end=number of pulses from F_start to F_end.
In the case of an S-curve:

t_j=jerk time, a_max=(F_end−F_start)/t_a, k=da/dt_max=a_max/t_j

The user can specify an n_target ($n_t$) that corresponds to the desired motion distance.

Case 1: Linear Acceleration, Acceleration=Deceleration

Figure 13:
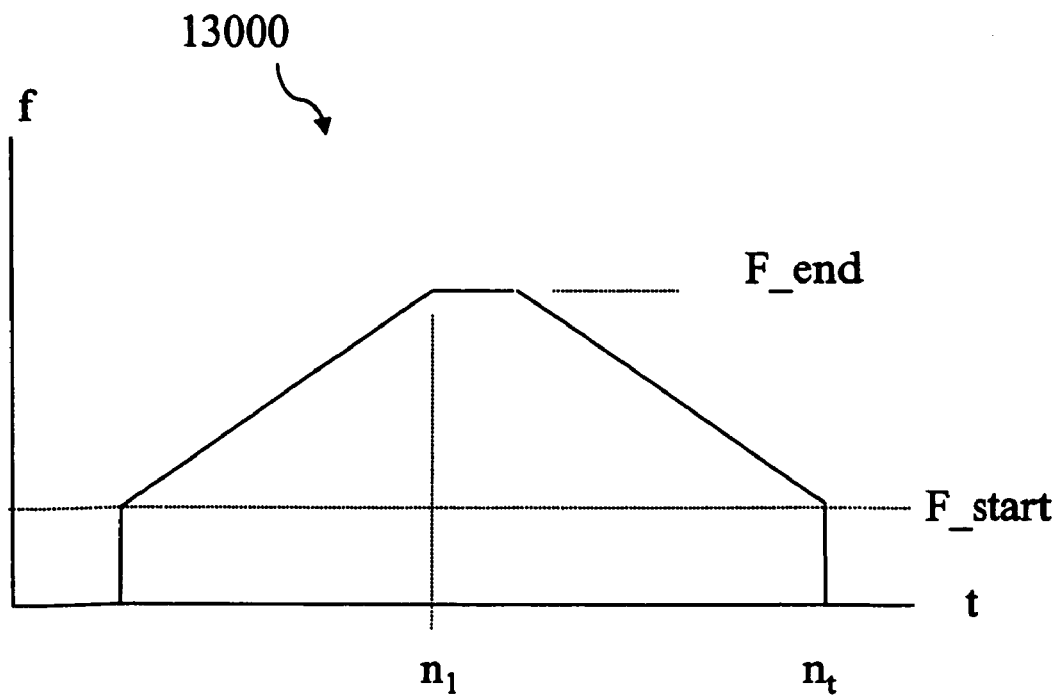
FIG. 13 is a graph of frequency versus time for an exemplary embodiment of the present invention.

FIG. 13 is a graph of frequency versus time for an exemplary embodiment of the present invention, showing this case. The problem case is identified by n_target<2*n_end.

Solution:

Choose way point $n_1$ just less than $n_t/2$, with associated $F_1$.

Profile consists of acceleration F_end to $F_1$, deceleration from $F_1$ to F_end, with an intermediate constant speed step of n_cs pulses, n_cs=$n_t$−2*$n_1$.

Case 2: Linear Acceleration, Acceleration a1 Not Equal to Deceleration a2.

Figure 14:
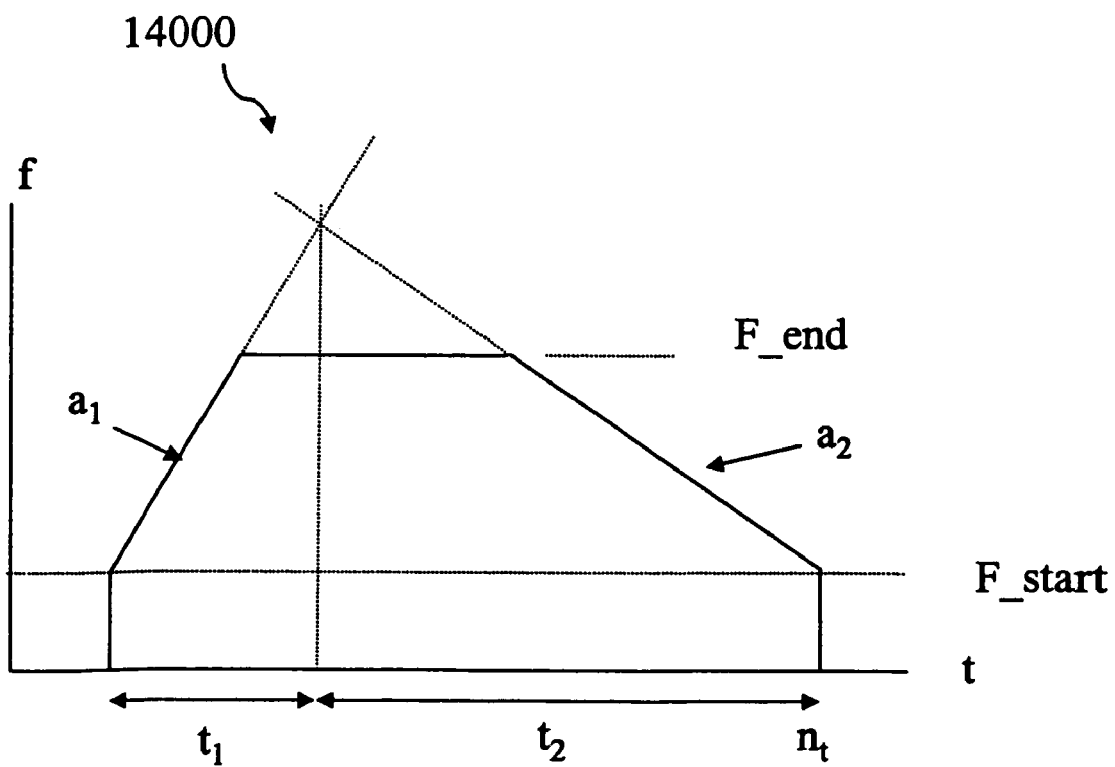
FIG. 14 is a graph of frequency versus time for an exemplary embodiment of the present invention.

FIG. 14 is a graph of frequency versus time for an exemplary embodiment of the present invention, showing this case. For deceleration slope: F_end is still the high frequency, n is counted up from low speed, just as if it was an acceleration slope. Problem case is identified by n_target<n_end_1+ n_end_2.

$$n_1=1/2 a_1 t_1^2 + F_0 t_1; n_2 = 1/2 a_2 t_2^2 + F_0 t_2; t_2 = (a_1/a_2) t_1$$

For very short moves, $F_0 * t$ might be an appreciable part of the total move.

$$n_t = F_0(t_1+t_2) + 1/2 a_1 t_1^2 + 1/2 a_2 t_2^2, \text{ or}$$

$$a_1/2(1+a_1/a_2)t_1^2 + (1+a_1/a_2)F_0 t_1 - n_t = 0$$

$$a_1/2 t_1^2 + F_0 t_1 - n_t/(1+a_1/a_2) = 0$$

$$t_1 = -F_0/a_1 + sqrt\{F_0^2/a_1^2 + 2n_t/(a_1(1+a_1/a_2))\}$$

For realizable motions there is always a positive number under the radical and the realizable root is always found by adding a positive square root to the initial term.

Use the above expression to compute $t_1$. Now, finding $n_1 = 1/2 \, a_1 t_1^2 + F_0 t_1$, choose way point just less than $n_1$ on the acceleration slope, with associated speed $F_1$. Interpolate as required on the deceleration slope to match speed between acceleration and deceleration slopes, finding an $n_2$ on the decel slope. As before, find the length of a constant speed step that links the two slopes, n_cs=$n_t - n_1 - n_2$. The total move is accelerate for $n_1$ steps, a (short) constant speed step n_cs, decelerate for $n_2$ steps.

Figure 15:
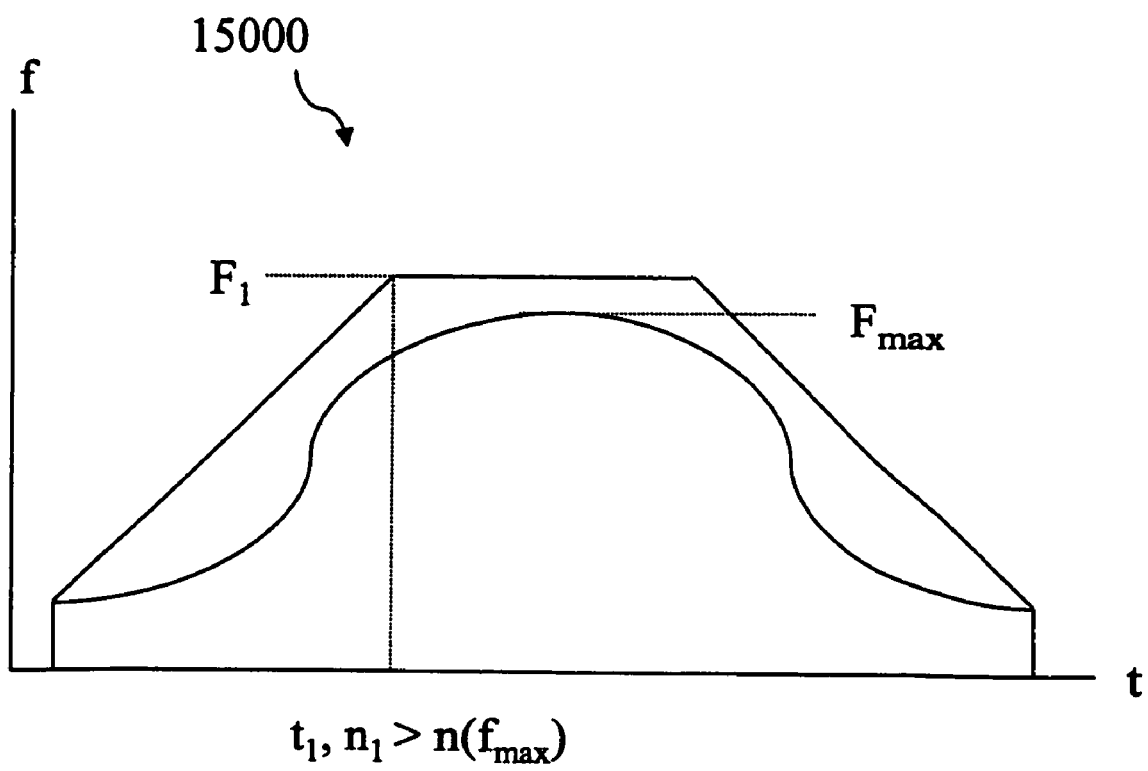
FIG. 15 is an S-curve graph of frequency versus time for an exemplary embodiment of the present invention.

Case 3: Short S-Curve—Distance n not Sufficient to Complete S-Curve to Max Speed FIG. 15 is an S-curve graph of frequency versus time for an exemplary embodiment of the present invention, showing this case.

For the case of a short S-curve: $t_j$=jerk time, $a_{max}$=(F_end− F_start)/t_a, k=da/dt_max=$a_{max}/t_j$ In the initial curve region:

$$a = k \, t$$

$$F = F_0 + 1/2 k \, t^2$$

F change with jerk time $t_j$: $F_j = 1/2 \, k \, t_j^2$

For the S-curve, recall there is an $F_j$ associated with jerk time, $t_j$, and that the change in F during the curve region is symmetrical during the increasing and decreasing acceleration portions of the curve.

One procedure is to solve for the simple trapezoid as before, identifying a maximum speed $F_1$ reached at count $n_1$ and time $t_1$. Then, reduce the maximum frequency to a new $F_{max}$ which can be achieved in the same accel/decel time $t_1$. The n_cs (constant speed region) now gets enlarged a bit from the simple trapezoid case, such that: n_cs=$n_t - 2*n(F_{max})$.

If t1>=2 tj: There is a linear region+2 full jerk times. Obtain $F_{max} = F_0 + 2*F_j + (t_1 - 2t_j)*a_{max}$. Apply standard S curve calculation to $F_{max}$ to get n vs. v up to $F_{max}$. Then the constant speed distance is n_cs=$n_t - 2*n(f_{max})$ If $t_1 < 2 \, t_j$: There will be a pure S-curve with an inflection point at $t_1/2$. The ΔF around the inflection point: $F_{inflection} = 1/2 \, k \, (t_1/2)^2$, and $F_{max} = F_0 + 2*F_{inflection} = F_0 + k(t_1/2)^2$. Apply the standard S curve to $F_{max}$ and find n_cs as before.

What follows is an exemplary pseudo-code subroutine listing for determining a plurality of target frequencies, pulse widths, differential pulse widths, and pulse counts, for a portion of a motion control profile, that portion being a single change in frequency according to a specified beginning frequency, ending frequency, maximum acceleration, and maximum change in acceleration(that is, an S-curve case) such as that described above. The target frequencies are distributed semi-logarithmically, with constraints to achieve realizable minimum time intervals, and maximum time intervals consistent with a desired level of accuracy in representation of the upper frequency portion of the S curve. All data input and output has been removed to clarify the algorithm.

```
Rem : S-curve version
Rem : Generate table of target pulse counts and pulse widths with
interpolation factor
Rem : divide up the ramp into steps ( way points ) of equal percentage
changes in F
Rem : for each step, find the target F, pulse width, pulse count, and
change in pulse width
Rem : per pulse needed to get there while staying on the slope
Rem :
Rem : limit change in acceleration per Jerk Time spec -- da_dt = a_max /
Jerk_time
Rem : keep a working buffer of steps, selectively plot points
Rem : so that a complete slope can be recorded
Rem : use f_end / f_start ratio to set target steps size
Rem : 1.15^32~100 ; 1.1^32~20 ; 1.1^48~100
Rem : e.g., for a 5% start speed (1/20), 32 steps will give ~10% dF/F
Rem : initial dF/F / step = exp (log ( fmax / fmin) / max_steps )
Rem : if step < 1 ms set step time to 1 ms
Rem : if step < 1 pulse set step time to 1 pulse
Rem : when F appreciable, set dF/F to a moderate mid-range value
Rem : then go to tighter spacing of steps in upper jerk range
Rem : m = clocks / pulse, n = pulse count at each step, dn = delta n per
step
Dim m(100) As Long
Dim n(100), dn As Long
Rem : a step is a pre-calculated way point, controlling multiple pulses
Dim step As Integer, pulse As Long
Rem : m_sum records actual elapsed time in clocks by adding m's for
each pulse
Rem : m_fix : shifted fixed point that accumulates fractional changes in
pulse width
Dim m_sum(100), m_fix As Long
Rem : fixed point shift is decimal for ease of de-bug, will be binary factor
(e.g., 1024) in use
Dim fix_shift As Long
fix_shift = 1000
Rem : elapsed time to beginning of step, time / step, jerk time
Dim t(100), dt, t_j As Double
Rem : dm is shifted fixed point fractional change in pulse width / pulse
Dim dm(100) As Long
Rem : frequency at step, jerk frequency associated with jerk time,
derivative of a
Dim f(100), f_j, da_dt As Double
Dim i, j, k, clear_row As IntegerRem: misc indices
Dim m_dt, m_bar As Double
Rem: input parameters: acceleration time, frequencies
Dim t_a, F_start, F_end, F_clock As Double
Rem: dF / F factor to compute equal percentage steps
Dim dF_factor As Double
Dim max_steps As Integer
Dim plot_row, plot_time, plot_f, plot_m, plot_n As Integer
Rem : starting values for stepping
Rem : time is at the beginning of a pulse & step
t(0) = 0
Rem : m is the count for the pulse that is executing
Rem : dm is applied at the end of a pulse... that is
Rem : the way point pulse is executed in full
m(0) = Int(F_clock / F_start)
f(0) = F_start
Rem : n is the count of pulses completed, starts at 0
n(0) = 0
Rem : a_max is mid-point slope, da_dt is limit set by jerk time
a_max = (F_end − F_start) / t_a
da_dt = a_max / t_j
Rem ; f_j is frequency change associated with jerk time
f_j = 0.5 * a_max * t_j
Rem : a_f is acceleration, function of frequency
a_f = 0
Rem : accumulator for all clocks in all pulses
m_sum(0) = 0
Rem : set expectation for early dF steps along ramp
f_ratio = F_end / F_start
dF_factor = Exp(Log(f_ratio) / max_steps)
f_ddF = F_end * 0.5
```

-continued

```
Rem : ask about -- can profile (speed, position settings) be changed
permanently from TD200?
Rem : Round Off Error Control
Rem : on each step, seek to re_establish correct SLOPE from current
position
Rem : rather than close adherence to steps vs. time
Rem : choose next F for each step as dF/F * F (last step )
Rem : choose a ( = dF/dt) for step as value for chosen F as ideal result
Rem : from applying da_dt
Rem : delta t for this step chosen as dF / a
Rem : dm (fixed point integer) determined to reach from actual m
Rem : of last step to new ideal m in ideal time dt
Rem : new m actual figured as n * dm added on to previous actual
Rem : new t actual figured from accumulated m
Rem : new f actual figured from m actual
slope_complete = False
step = 0
Rem : main stepping loop – 1 loop per way point
Do Until slope_complete
step = step + 1
Rem : find the target frequency, time, counts, for end of step
Rem : clamp dF_factor for mid-range, then reduce for upper jerk region
f(step) = f(step – 1) * dF_factor
If f(step) >= 0.99 * F_end Then
f(step) = F_end
slope_complete = True
End If
Rem : current value of a(f), sub for a(t), determined separately for
Rem : lower jerk range
Rem : mid range
Rem : upper jerk range
Rem : first if covers F_end < 2*f_j, hands control early to last else if
If f(step) < (f(0) + f_j) And f(step) < (F_end / 2) Then
a_f = Sqr(2 * (f(step) – f(0)) * da_dt)
ElseIf f(step) < (F_end – f_j) Then a_f = a_max
ElseIf Not slope_complete Then
a_f = Sqr(2 * (F_end – f(step – 1)) * da_dt)
dF_factor = 1.01 + a_f / a_max * 0.05
End If
Rem : find provisional time dt for next step to this target F
Rem : if needed, adjust step time > 1 ms and > 1 pulse time
Rem : if step time is increased to meet mins, adjust target F and dF_factor
dt = (f(step) – f(step – 1)) / a_f
If dt < 0.001 Or (dt < (1 / f(step – 1))) Then
dt = max(0.001, 1 / f(step – 1))
t(step) = t(step – 1) + dt
Rem : since t changed, choose next f for ideal adherence to t
f(step) = a_f * (t(step) – t(0)) + f(0)
Rem adjust step ratio to reach final F from current step
f_ratio = F_end / f(step)
if step <> max_steps Then dF_factor = Exp(Log(f_ratio) / (max_steps –
step))
Else
t(step) = t(step – 1) + dt
End If
Rem : find next m for chosen f
m_ideal = F_clock / f(step)
Rem : find total clocks to next step
m_dt = dt * F_clock
Rem : average m / pulse to next step
m_bar = (m_ideal + m(step – 1)) / 2
Rem : pulses to next step (dn) is total clocks divided by average m
dn = Int(0.5 + m_dt / m_bar)
n(step) = n(step – 1) + dn
Rem : with new m and dn, find dm / pulse
Rem : change radix of dm fixed point to maintain precision
Do
dm(step – 1) = Int(fix_shift * (m_ideal – m(step – 1)) / dn)
If (Abs(dm(step – 1)) < 100) Then fix_shift = fix_shift * 10
Loop Until Abs(dm(step – 1)) >= 100
Cells(plot_row, plot_dm).Value = dm(step – 1)
Rem : compute true m(step)and t(step) by adding up dm's as hardware will
m_fix = CLng(m(step – 1)) * fix_shift
m_sum(step) = m_sum(step – 1)
plot_ref = m_fix
Rem : for each pulse, add dm to m, accumulate total clocks
For pulse = n(step – 1) + 1 To n(step)
m_sum(step) = m_sum(step) + Int(m_fix / fix_shift)
m_fix = m_fix + dm(step – 1)
```

```
Next pulse
Rem : end for / next loop of pulses between steps (way_points)
Rem : replace ideal m and t for this step with actuals
m(step) = m_fix / fix_shift
f(step) = F_clock / m(step)
t(step) = m_sum(step) / F_clock
Loop
Rem : end looping on steps (way_points) until slope_complete
End Sub
```

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. For example, programming of the motion module can occur over the Internet. Likewise, transmission of the pulse train can occur over the Internet. References specifically identified and discussed herein are incorporated by reference as if fully set forth herein. Accordingly, the drawings and descriptions are to be regarded as illustrative in nature, and not as restrictive.

What is claimed is:

1. A method, comprising:
obtaining a first position, a second position, and a maximum motion parameter for a movement between the first position and the second position;
calculating, using a processor, based in part on the maximum motion parameter, a pulse width, a pulse count, and a differential pulse width corresponding to each of a plurality of target frequencies for the movement;
creating a table of values comprising the plurality of target frequencies and the pulse width, the pulse count, and the differential pulse width corresponding to each of the target frequencies;
selecting at least one of the plurality of target frequencies; and
outputting at least a portion of the values corresponding to the at least one of the plurality of target frequencies from a pulse generator.

2. The method of claim 1, further comprising constraining at least a subset of the values by the maximum motion parameter.

3. The method of claim 1, further comprising determining each target frequency from the plurality of target frequencies.

4. The method of claim 1, wherein the plurality of target frequencies are semilogarithmically distributed.

5. The method of claim 1, further comprising transmitting the values to a motion device.

6. The method of claim 1, further comprising transmitting the values via the Internet.

7. The method of claim 1, wherein the pulse generator is integral to a programmable logic controller.

8. The method of claim 1, wherein the maximum motion parameter is a speed.

9. The method of claim 1, wherein the maximum motion parameter is an acceleration.

10. The method of claim 1, wherein the maximum motion parameter is a time rate of change of acceleration.

11. The method of claim 1, wherein the maximum motion parameter is a time rate of change of jerk.

12. The method of claim 1, wherein the pulse generator outputs at least the portion of the values to a motion device.

13. The method of claim 1, wherein the differential pulse widths are included in a pre-computed table and are distributed according to a constrained semi-logarithmic distribution.

14. The method of claim 1, wherein the differential pulse widths are changed by means of an additive interpolation between pre-computed points.

15. The method of claim 1, wherein the differential pulse widths are changed by adding one of a positive and a negative number of clock events to a current value, the one of the positive and the negative numbers being a combination of an integral number and a fractional number.

16. A computer-readable medium containing computer executable instructions to perform a method, the method comprising:
   obtaining a first position, a second position, and a maximum motion parameter for a movement between the first position and the second position;
   calculating, using a processor, based in part on the maximum motion parameter, a pulse width, a pulse count, and a differential pulse width corresponding to each of a plurality of target frequencies for the movement;
   creating a table of values comprising the plurality of target frequencies and the pulse width, the pulse count, and the differential pulse width corresponding to each of the target frequencies;
   selecting at least one of the plurality of target frequencies; and
   outputting at least a portion of the values corresponding to the at least one of the plurality of target frequencies from a pulse generator.

17. A method, comprising:
   outputting values from a pulse generator, the values adapted to cause a movement between a first position and a second position, the values obtained from a table of values comprising a plurality of target frequencies for the movement, the table of values also comprising a pulse width, a pulse count, and a differential pulse width corresponding to each of the target frequencies, the table of values created based upon the first position, the second position, and a maximum motion parameter for the movement between the first position and the second position, wherein the pulse width, the pulse count, and the differential pulse width corresponding to each of a plurality of target frequencies are calculated, using a processor, based in part on the first position, the second position, and the maximum motion parameter, and wherein the values are obtained from the table for outputting by selecting at least one of the plurality of target frequencies.

* * * * *